(12) United States Patent
Rapaka et al.

(10) Patent No.: US 10,070,130 B2
(45) Date of Patent: Sep. 4, 2018

(54) FLEXIBLE PARTITIONING OF PREDICTION UNITS

(71) Applicant: QUALCOMM Incorporated, San Diego, CA (US)

(72) Inventors: Krishnakanth Rapaka, San Diego, CA (US); Vadim Seregin, San Diego, CA (US); Chao Pang, Marina del Ray, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 15/009,657

(22) Filed: Jan. 28, 2016

(65) Prior Publication Data
US 2016/0227214 A1 Aug. 4, 2016

Related U.S. Application Data

(60) Provisional application No. 62/110,401, filed on Jan. 30, 2015.

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/11* (2014.11);
(Continued)

(58) Field of Classification Search
CPC ...... H04N 19/105; H04N 19/13; H04N 19/70; H04N 19/119; H04N 19/513; H04N 19/11;
(Continued)

(56) References Cited

U.S. PATENT DOCUMENTS

2016/0134857 A1* 5/2016 An .................. H04N 19/597
348/43

FOREIGN PATENT DOCUMENTS

WO 2015003635 A1 1/2015

OTHER PUBLICATIONS

Response to Written Opinion dated Apr. 25, 2016, from international application No. PCT/US2016/015634, filed Nov. 28, 2016, 20 pp.

(Continued)

*Primary Examiner* — Zhihan Zhou
(74) *Attorney, Agent, or Firm* — Shumaker & Sieffert, P.A.

(57) ABSTRACT

In one example, a method of coding video data includes coding, from an encoded video bitstream, a syntax element that indicates a number of lines of video data that are in one or more of a plurality of sub-PUs of a current prediction unit (PU) of a current coding unit (CU) of video data. In this example, the method further includes determining, for each respective sub-PU of the plurality of sub-PUs, a respective vector that represents a displacement between the respective sub-PU and a respective predictor block from a plurality of previously decoded blocks of video data. In this example, the method further includes reconstructing each sub-PU of the plurality of sub-PUs based on the respective predictor blocks of video data.

30 Claims, 8 Drawing Sheets

(51) Int. Cl.

| | | |
|---|---|---|
| *H04N 19/176* | (2014.01) | |
| *H04N 19/70* | (2014.01) | |
| *H04N 19/513* | (2014.01) | |
| *H04N 19/11* | (2014.01) | |
| *H04N 19/117* | (2014.01) | |
| *H04N 19/13* | (2014.01) | |
| *H04N 19/137* | (2014.01) | |
| *H04N 19/182* | (2014.01) | |
| *H04N 19/186* | (2014.01) | |
| *H04N 19/44* | (2014.01) | |
| *H04N 19/52* | (2014.01) | |
| *H04N 19/593* | (2014.01) | |
| *H04N 19/61* | (2014.01) | |

(52) U.S. Cl.
CPC ........... *H04N 19/117* (2014.11); *H04N 19/13* (2014.11); *H04N 19/137* (2014.11); *H04N 19/176* (2014.11); *H04N 19/182* (2014.11); *H04N 19/186* (2014.11); *H04N 19/44* (2014.11); *H04N 19/513* (2014.11); *H04N 19/52* (2014.11); *H04N 19/593* (2014.11); *H04N 19/619* (2014.11); *H04N 19/70* (2014.11)

(58) Field of Classification Search
CPC .... H04N 19/44; H04N 19/186; H04N 19/182; H04N 19/137; H04N 19/619; H04N 19/117; H04N 19/593; H04N 19/52; H04N 19/176
See application file for complete search history.

(56) References Cited

OTHER PUBLICATIONS

Second Written Opinion of International Application No. PCT/US2016/015634, dated Feb. 16, 2017, 7 pp.
International Preliminary Report on Patentability of International Application No. PCT/US2016/015834, dated Apr. 28, 2017, 13 pp.
International Search Report and Written Opinion from International Application No. PCT/US2016015634, dated Apr. 15, 2016, 14 pp.
Xu, et al., "On Unification of Intra Block Copy and Inter-picture Motion Compensation," 17th Meeting; Mar. 27, 2014-Apr. 1, 2014 ; Valencia, ES; (Joint Collaborative Team on Video Coding of ISO/IEC JTC1/SC29/WG11 and ITU-T SG.16); URL: http://wftp3.itu.int/av-arch/jctvc-site/, No. JCTVC-Q0132-v5, Apr. 3, 2014, XP030116062, 14 pp.
Zheng, et al., "TE3.2: Huawei & HiSilicon Report on Flexible Motion Partitioning Coding," 3rd Meeting; 94th MPEG Meeting; Oct. 7-15, 2010; Guangzhou, CN; (Joint Collaborative Team on Video Coding of ISO/IECJTC1/SC29/WG11 and ITU-T SG.16); URL: http://wftp3.itu.int/av-arch/jctvc-site/,, No. JCTVC-0099, Oct. 2, 2010, XP030007806, ISSN: 0000-0045, 4 pp.
Zhu, et al., "AMP for Intra BC Prediction," 17th Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0135, Mar. 18, 2014, XP030116065, 3 pp.
Wiegand et al., "WD1: Working Draft 1 of High-Efficiency Video Coding," JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, CH, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Jan. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Cao et al., "CE6.1 Report on Short Distance Intra Prediction Method", 5th Meeting, Geneva, CH, Mar. 16 through 23, 2011, (Joint Collaborative Team on Video Coding (JCT-VC) of ITU-T SG16 WP3 and ISO/IEC JTC1/SC29/WG11); JCTVC-E278, Mar. 23, 2011, 7 pp.
Joshi et al., "High Efficiency Video Coding (HEVC) Screen Content Coding: Draft 1", 18th Meeting, Sapporo, JP, Jun. 30 through Jul. 9, 2014, (Joint Collaborative Team on Video Coding (JCT-VC) of ITU-T SG16 WP3 and ISO/IEC JTC1/SC29/WG11); JCTVC-R1005_v3, Sep. 27, 2014, 362 pp.
Pang et al., "Non-RCE3: Intra Motion Compensation with 2-D MVs", 14th Meeting, Vienna, AT, Jul. 25 through Aug. 2, 2013, (Joint Collaborative Team on Video Coding (JCT-VC) of ITU-T SG16 WP3 and ISO/IEC JTC1/SC29/WG11); JCTVC-N0256, Aug. 2, 2013, 112 pp.
Wang et al., "High Efficiency Video Coding (HEVC) Defect Report 2", 15th Meeting, Geneva, CH, Oct. 23 through Nov. 1, 2013, (Joint Collaborative Team on Video Coding (JCT-VC) of ITU-T SG16 WP3 and ISO/IEC JTC1/SC29/WG11); JCTVC-O1003_v2, Nov. 24, 2013, 311 pp.
Flynn et al., "High Efficiency Video Coding (HEVC) Range Extensions text specifiation: Draft 7", 17th Meeting, Valencia, ES, Mar. 27 through Apr. 4, 2014, (Joint Collaborative Team on Video Coding (JCT-VC) of ITU-T SG16 WP3 and ISO/IEC JTC1/SC29/WG11); JCTVC-Q1005_v4, Apr. 10, 2014, 376 pp.
Flynn et al., "High Efficiency Video Coding (HEVC) Ranger Extensions text specification: Draft 6", 16th Meeting, San Jose, US, Jan. 9 through 17, 2014, (Joint Collaborative Team on Video Coding (JCT-VC) of ITU-T SG16 WP3 and ISO/IEC JTC1/SC29/WG11); JCTVC-P1005_v1, Feb. 19, 2014, 368 pp.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

(56) References Cited

OTHER PUBLICATIONS

Rapaka et al., "Non-CE3: Adaptive PU partitioning for intra block copy", 20th Meeting, Geneva, CH, Feb. 10 through 18, 2015, (Joint Collaborative Team on Video Coding (JCT-VC) of ITU-T SG16 WP3 and ISO/IEC JTC1/SC29/WG11); JCTVC-T0091, Feb. 11, 2015, 3 pp.

Weigand et al., "WD2: Working Draft 2 of High-Efficiency Video Coding", 4th Meeting, Daegu, KR, Jan. 20 through 28, 2011; (Joint Collaborative Team on Video Coding (JCT-VC) of ITU-T SG16 WP3 and ISO/IEC JTC1/SC29/WG11); JCTVC-D503 (JCTVC-E278 spec text), Mar. 23, 2011, 167 pp.

\* cited by examiner

FLEXIBLE PARTITIONING OF PREDICTION UNITS

This application claims the benefit of U.S. Provisional Application No. 62/110,401, filed Jan. 30, 2015, the entire content of which is incorporated by reference herein in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs), prediction units (PUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques for performing video coding. More particularly, this disclosure describes techniques for facilitating the flexible division of a prediction unit (PU) of a coding unit (CU) into two or more sub-PUs.

In one example, a method for decoding video data includes decoding, from an encoded video bitstream, a syntax element that indicates a number of lines of video data that are in one or more of a plurality of sub-PUs of a current PU of a current CU of video data; determining, for each respective sub-PU of the plurality of sub-PUs, a respective vector that represents a displacement between the respective sub-PU and a respective predictor block from a plurality of previously decoded blocks of video data; and reconstructing each sub-PU of the plurality of sub-PUs based on the respective predictor blocks of video data.

In another example, a method of encoding video data includes determining to divide a current PU of a current CU of video data into a plurality of sub-PUs; determining, for each respective sub-PU of the plurality of sub-PUs, a respective vector that represents a displacement between the respective sub-PU and a respective predictor block from a plurality of previously decoded blocks of video data; and encoding, in an encoded video bitstream, a syntax element that indicates a number of lines of video data that are in one or more of the plurality of sub-PUs.

In another example, a device for encoding or decoding video data includes a memory configured to store video data, and one or more processors. In this example, the one or more processors are configured to: encode or decode, from an encoded video bitstream, a syntax element that indicates a number of lines that are in one or more of a plurality of sub-PUs of a current PU of a current CU of video data; determine, for each respective sub-PU of the plurality of sub-PUs, a respective vector that represents a displacement between the respective sub-PU and a respective predictor block from a plurality of previously decoded blocks of video data; and reconstruct each sub-PU of the plurality of sub-PUs based on the respective predictor blocks of video data.

In another example, a device for encoding or decoding video data includes means for encoding or decoding, from an encoded video bitstream, a syntax element that indicates a number of lines that are in one or more of a plurality of sub-PUs of a current PU of a current CU of video data; means for determining, for each respective sub-PU of the plurality of sub-PUs, a respective vector that represents a displacement between the respective sub-PU and a respective predictor block from a plurality of previously decoded blocks of video data; and means for reconstructing each sub-PU of the plurality of sub-PUs based on the respective predictor blocks of video data.

In another example, a computer-readable storage medium storing instructions that, when executed, cause one or more processors of a video encoding or decoding device to: encode or decode, from an encoded video bitstream, a syntax element that indicates a number of lines that are in one or more of a plurality of sub-PUs of a current PU of a current CU of video data; determine, for each respective sub-PU of the plurality of sub-PUs, a respective vector that represents a displacement between the respective sub-PU and a respective predictor block from a plurality of previously decoded blocks of video data; and reconstruct each sub-PU of the plurality of sub-PUs based on the respective predictor blocks of video data.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
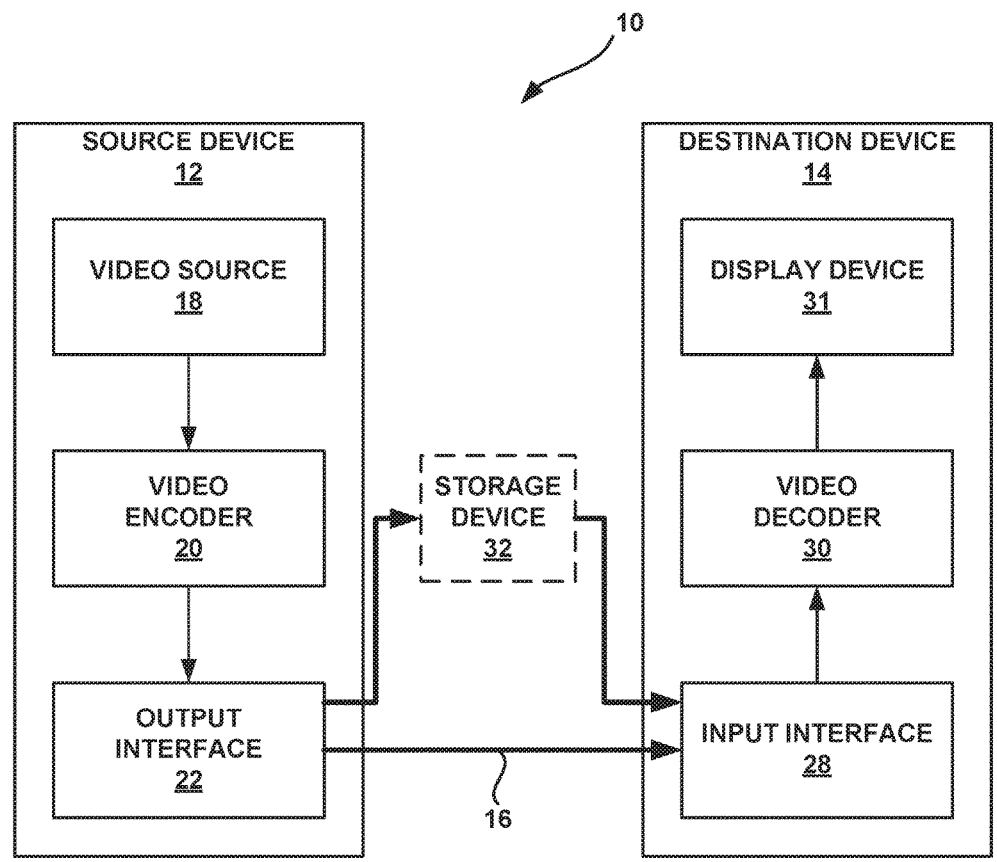
FIG. 1 is a block diagram illustrating an example video encoding and decoding system that may utilize the techniques described in this disclosure.

A video sequence is generally represented as a sequence of pictures. Typically, block-based coding techniques are used to code each of the individual pictures. That is, each picture is divided into blocks, and each of the blocks is individually coded. Coding a block of video data generally involves forming predicted values for pixels in the block and coding residual values. The predicted values are formed using pixel samples in one or more predictive blocks. The residual values represent the differences between the pixels of the original block and the predicted pixel values. Specifically, the original block of video data includes an array of pixel values, and the predicted block includes an array of predicted pixel values. The residual values represent pixel-by-pixel differences between the pixel values of the original block and the predicted pixel values.

Prediction techniques for a block of video data are generally categorized as intra-prediction and inter-prediction. Intra-prediction, or spatial prediction, does not include prediction from any reference picture; instead the block is predicted from pixel values of neighboring, previously coded blocks. Inter-prediction, or temporal prediction, generally involves predicting the block from pixel values of one or more previously coded reference pictures (e.g., frames or slices).

In addition to a variety of prediction techniques, a video encoder may also utilize a variety of block sizes when encoding video data. For example, when encoding video data using intra-prediction under the High Efficiency Video Coding (HEVC) video coding standard (ITU-T H.265, Series H: Audiovisual and Multimedia Systems, Infrastructure of Audiovisual Services—Coding of Moving Video, April, 2015, available at http://www.itu.int/rec/T-REC-H.265-201504-I/en), a video encoder may divide a video picture into a sequence of treeblocks or largest coding units (LCU), which may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in the HEVC standard has a purpose similar to that of a macroblock of the H.264 standard. However, a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples.

HEVC supports prediction in various predefined PU sizes, also referred to as partition modes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N (where N represents half the length of a CU's side). HEVC also supports asymmetric motion partitioning (AMP) for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In general, partitioning a CU into PUs enables a video encoder to obtain better prediction and minimize residual values. However, in some examples, it may not be desirable for a video encoder to be limited to a predefined set of PU sizes when dividing a CU of video data. For instance, when encoding screen content sequences, which exhibit rapid changes in the content, the fixed PU partition sizes may not be efficient.

In some examples, a video encoder may utilize short distance intra prediction (SDIP). SDIP is a technique, e.g., as described by Cao et al., "CE6.b1 Report on Short Distance Intra Prediction Method," Joint Collaborative Team on Video Coding (JCT-VC) of ITU-T SG16 WP3 and ISO/IEC JTC1/SC29/WG11, 5th Meeting: Geneva, 16-23 Mar. 2011, Document: JCTVC-E278 (hereinafter "JCTVC-E278"), where one N×N square block which is smaller than 32×32 is divided into several lines or non-square blocks with rectangle shape, and pixels are predicted and reconstructed line by line or rectangle by rectangle. As one example, JCTVC-E278 provides that a 16×16 CU can not only be divided into four 8×8 PUs, but also be divided into four 4×16/16×4 PUs, and a 4×16/16×4 PU can be further split into four 1×16/16×1 partitions. As another example, JCTVC-E278 provides that an 8×8 CU can be divided into four 2×8/8×2 PUs, and every 4×4 PU can be further divided into four 1×4/4×1 partitions. In summary, JCTVC-E278 provides that two types of PUs are supported in SDIP, the first is rectangular PU named as hN×2N/2N×hN, where h means half (½), the second is line based PU named as 1×N/N×1. While SDIP may, in some examples, enable a video encoder to encode video data with reduced residual values, the resulting coding complexity and bandwidth requirements may not be desirable.

In accordance with one or more techniques of this disclosure, as opposed to being restricted to fixed size PUs (e.g., 2N×2N, 2N×N, N×2N, N×N, 2N×nU, 2N×nD, nL×2N, and nR×2N) or line based PUs (e.g., SDIP), a video encoder may implement a flexible partitioning scheme in which a PU may be divided into a plurality of sub-PUs that each include an adjustable number of lines (i.e., rows or columns). As one example, a video encoder may divide a 32×32 CU into four 16×16 PUs (e.g., N×N) and further divide at least one of the 16×16 PUs into one 3×16 sub-PU and one 13×16 sub-PU. As another example, a video encoder may divide a 16×16 CU into one 12×16 PU and one 4×16 PU (e.g., nR×2N) and further divide the 12×16 PU into one 5×16 sub-PU and one 11×16 sub-PU. In this way, a video encoder may obtain better prediction and minimize residual values.

In some examples, the techniques of this disclosure may be applicable to Intra Block Copying (BC). Many applications, such as remote desktop, remote gaming, wireless displays, automotive infotainment, cloud computing, etc., are becoming routine in daily lives. Video contents in these applications are usually combinations of natural content, text, artificial graphics, etc. In text and artificial graphics region, repeated patterns (such as characters, icons, symbols, etc.) often exist. Intra BC is a technique which may enable a video coder to remove such redundancy and improve intra-picture coding efficiency. In some instances, Intra BC alternatively may be referred to as Intra motion compensation (MC).

To predict a current block of video data using some Intra BC techniques, a video coder may determine a block vector that identifies a predictive block of video data (i.e., a block of previously coded video data) that is within the same picture as the current block of video data. As one example, a video encoder may select the predictive block as a block of previously coded video data that is found to closely match the current block of video data, and generate a vector that indicates a position of the predictive block relative to the current block. As another example, a video decoder may receive an indication of a vector that indicates a position of a predictive block relative to a current block.

In some examples, as opposed to simply encoding a value of the block vector without compression, a video encoder may implement a compression scheme to encode the value of the block vector as a difference between the block vector and a block vector predictor. In some examples, the block vector predictor may be the previously coded block vector (i.e., in a coding order). For instance, to encode the value of a block vector for a current block, a video encoder may determine a difference between the block vector and the previously coded block vector, and encode one or more syntax elements that indicate the difference between the block vector and the previously coded block vector.

To decode the value of the block vector for the current block, a video decoder may perform a complimentary process. For instance, the video decoder may receive the one or more syntax elements that indicate the difference between the block vector and the previously coded block vector, determine the value of the block vector for the current block based on the previously coded block vector and the one or more syntax elements. In this way, video coders may reduce the amount of data used to code a block vector.

However, in some examples, it may be desirable to utilize block vector predictors other than the previously coded block vector. As one example, for some blocks, it may be desirable to use a block vector of a neighboring block as a block vector predictor. For instance, the difference between a block vector of a current block and a block vector of a neighboring block may be less than the difference between the block vector and the current block and the previously coded block vector. As another example, for some blocks, it may not be possible to use either a previously coded block vector or a block vector of a neighboring block as a block vector predictor. For instance, there may not be a previously coded block vector or block vector of a neighboring block available for use as a block vector predictor for the first block in a coding tree unit (CTU) coded using Intra BC.

In some examples, as opposed to always using the previously coded block vector as the block vector predictor when encoding a block of video data, a video encoder may utilize a plurality of block vector predictor candidates selected from a plurality of sources. For instance, the video encoder may generate a plurality of block vector predictor candidates which may be selected from block vectors of neighboring blocks, block vectors of previously decoded blocks, and default block vectors, select a particular block vector predictor candidate of the plurality of block vector predictor candidates, and encode a plurality of syntax elements that indicate which block vector predictor candidate of the plurality of block vector predictor candidates is selected and a difference between the block vector and the selected block vector predictor candidate.

To decode the value of the block vector for the current block, a video decoder may perform a complimentary process. For instance, the video decoder may receive the plurality of syntax elements, generate a plurality of block vector predictor candidates (i.e., using techniques similar to the video encoder), select a particular block vector predictor candidate of the plurality of block vector predictor candidates based on a syntax element of the plurality of syntax elements that indicates which block vector predictor candidate of the plurality of block vector predictor candidates was selected by the video encoder, and determine the value of the block vector for the current block based on the particular block vector predictor candidate and the one or more syntax elements that indicate the difference between the block vector and the selected block vector predictor candidate. In this way, video coders may further reduce the amount of data used to code a block vector.

In some examples, Intra BC may be "merged" with the inter-prediction mode. For instance, a current picture may be added to a reference picture list (RPL) used during prediction of block of the current picture such that a motion vector for a block in the current picture may point to a predictive block that also resides in the current picture.

In some examples, the block vector may have a plurality of components. For instance, the block vector may have a horizontal component (x) and a vertical component (y). As such, in some examples, the video encoder may encode the value of each respective component of the block vector by generating a respective plurality of syntax elements that collectively represent the value of the respective component of the block vector. In some examples, the video encoder may use the same block vector predictor candidate for each of the plurality of components. In some examples, the video encoder may different block vector predictor candidates for each of the plurality of components. A video decoder may implement a complementary scheme to decode the plurality of syntax elements into the respective values of the components of the block vector.

As described by Joshi et al., "High Efficiency Video Coding (HEVC) Screen Content Coding: Draft 1," Document: JCTVC-R1005_v3, JCT-VC of ITU-T SG 16 WP 3 and ISO/IEC JTC 1/SC 29/WG 11, 18$^{th}$ Meeting: Saopporo, J P 30 Jun.-9 Jul. 2014 (hereinafter "SCC Draft 1"), Intra BC is enabled at both CU and PU level. For PU level intra BC, 2N×N and N×2N PU partition is supported for all the CU sizes. In addition, when the CU is the smallest CU, N×N PU partition is supported. The Intra BC PU partition sizes are always regular (i.e., symmetrical).

In some examples, a video encoder may implement the flexible partitioning scheme of this disclosure in the context of Intra BC. For example, as opposed to being restricted to dividing a CU into pre-defined regular PUs, a video encoder may divide a PU into a plurality of sub-PUs that each include an adjustable number of lines (i.e., rows or columns). For each respective sub-PU of the sub-PUs, the video encoder may signal an indication of a block vector that indicates a position of a respective predictor block that resides in the same picture as the CU.

A sub-PU is further split from a PU, and this split is signalled in the bitstream. In some examples, there may be no change to signalling of the PU mode information (i.e., the PU mode information may be signalled the same regardless of whether the PU is sub-divided). Each sub-PU may have an associated vector in the similar lines to the PU. In some examples, the block motion compensation may be same as SCC Draft 1 and may be unchanged. This flexible partitioning may be enabled for all PUs in a CU, or only for some certain PU partitions within a CU, or for some certain CU sizes, for example for CU sizes 16×16 and above. In another example the sub-PUs can be enabled only when a CU has 2 PUs. In another alternative, the sub-PU split can be enabled for 2N×N or N×2N, and not for 2N×2N, N×N, or AMP partitions.

A video coder may signal/code the mode for a PU. For instance, a video coder may code a flag at the PU level indicating if adaptive partitioning is enabled or not. When adaptive partitioning is enabled, a video coder may code sub-partition information. When not enabled, a video coder may assume that there are no sub-partitions in the PU. In some examples, this mode may be disabled for N×N PU mode (that is, a video coder may not code the flag when PU mode is N×N). In some examples, a video coder may code a flag could at the CU level to indicate whether or not all of the PUs in the CU have sub-partition information.

In some examples, a maximum of two sub-PUs can be enabled for each PU and the split information may be coded by a video coder. In some examples, the number of sub-PU's (such as 1, 2, 3, 4, . . . up to the number of lines in the PU) for the PU could be coded at sequence-level, picture level, or slice level (SPS, PPS, or slice header) and corresponding PU split info may be coded for each PU.

In some examples, a video coder may restrict the maximum number of sub-PUs to four for a CU. In some examples, a video coder may code the maximum number of sub-PUs (such as 1, 2, 3, 4, . . . up to the number of lines in the PU) for the PU at sequence-level, picture level, or slice level (SPS, PPS, or slice header).

In some examples, a video coder may add other restrictions. For instance, a video coder may require that the number of rows (columns) in each sub-PU be larger than N (N=1, 2, 3, 4, 5 . . . etc.).

In some examples, the block vectors for the sub-PUs may be predicted (i.e., based on a block vector predictor). In some examples, block vector predictors for each sub-PU may be the same as the predictors of the current PU. In some examples, the predictors for the current PU may be derived as in SCC Draft 1. In some examples, the non-first sub-PU may use any of the already decoded block vectors of previous sub-PU as a predictor. The already decoded block vectors of previous sub-PU may be added into the candidate list after the spatial (i.e., neighboring) candidates. In some examples, the non-first sub-PU may use only previously (latest) already coded block vectors of previous sub-PU as a predictor. In some examples, block vector merge can be introduced with the merge_flag, which may indicate whether or not to use merge, and merge_idx, which may indicate which merge candidate to use in the candidate set. In this case no BVD needs may be coded. The merge candidate set can be constructed only using N previously coded BVs, or it can include the spatial or temporal neighbors as in HEVC merge. It is possible that the candidate sets for the first and non-first sub-PU are different. For example, the first sub-PU may use the candidate set as HEVC merge; and the non-first sub-PU may only use the previously coded BVs.

This disclosure proposes several techniques for coding respective block vector difference (BVD) values for the respective sub-PUs. According to a first technique of this disclosure, a video coder may code one bin $b_0$ to indicate if the value of BVD is greater than zero or not. Then, the video coder may code one bin $b_1$ to indicate if the value of BVD is greater than N or not. In some examples, if the value of BVD is greater than N (N=1, 2, 3, 4, . . . ), then the video coder may code the remainder (BVD minus N) using exponential golomb (EG) codes with order K (K=0, 1, 2, 3, 4 . . . ). In other examples, the video coder may code the value of the BVD minus one using bypass coded fixed length (FL) codes with a length based on N. In other examples, the video coder may code the value of the BVD minus one using truncated codes. In some example, the video coder may code the $bin_0$ using a context or bypass coded. Similarly, the video coder may code bin $b_1$ using a context or bypass coded.

According to a second technique of this disclosure, a video coder may code one bin, $b_0$, to indicate if the value of BVD is greater than zero or not. If the value of BVD is not equal to zero, the video coder may code then remaining (BVD minus 1) using EG codes with order K (K=0, 1, 2, 3, 4 . . . ).

According to a third technique of this disclosure, a video coder may code the BVD of a first sub-PU using context coded bins (as discussed above with respect to the first technique and the second technique). The video coder may code the BVD's of the remaining sub-PUs using bypass coded bins (as discussed above with respect to the first technique and the second technique).

As discussed above, a video coder may code split information for the sub-PUs. In some examples, a video coder may code the split information for a sub-PU by coding a number of lines (e.g., rows or columns) in the sub-PU. In some examples, the video coder may code this split information for each sub-PU in the PU except for a last sub-PU, in which case the number of lines could be inferred based on the total number of lines in the PU less the lines allocated to the other sub-PUs.

For example, if there are two sub-PU's in the current PU and the partition is such that a first sub-PU includes three lines and a second sub-PU includes the remaining lines, a video coder may explicitly signal that the first sub-PU includes three lines and not explicitly signal the number of lines included in the second sub-PU.

In some examples, a video coder may code the number of lines in a sub-PU using truncated unary code. In some of such examples, the max length of the truncated unary code may be based on the number of rows in the PU.

In another example, a video coder may code the number of lines in a sub-PU using fixed length code. In some of such examples, the length of the fixed length code may be based on the number of rows in the PU.

In some examples, a video coder may partition the sub-PU's within a PU in either direction (horizontal and vertical). In some examples, the video coder may code an indication of the partition direction in the bitstream (e.g., using a 1-bit by-pass coded flag).

In some examples, a video coder may impose one or more restrictions on the sub-PU split. As one example, a video coder may prevent a split from indicating that a PU is not divided (i.e., that one of the sub-PUs have zero height or width). As another example, a video coder may restrict the sub-PU partitioning to be horizontally split if the PU is vertically oriented, or vertically split if the PU is horizontally oriented. In some of such examples, the video coder may not explicitly code the partition direction.

In some examples, a video coder may code split information using a pre-defined syntax structure. As one example, a video coder may code the split information using the syntax structure shown below in Table 1. Though the number of sub-PUs are fixed to a size of two in Table 1, similar examples can be illustrated where the number of sub-PU are fixed to another size (e.g., 1, 2, 3, 4, 5, . . . up to the number of rows/columns in the PU).

TABLE 1

| prediction_unit( x0, y0, nPbW, nPbH ) { | Descriptor |
|---|---|
| if( cu_skip_flag[ x0 ][ y0 ] ) { | |
|   if( MaxNumMergeCand > 1 ) | |
|     merge_idx[ x0 ][ y0 ] | ae(v) |
| } else if( intra_bc_flag[ x0 ][ y0 ] ) /* Intra BC*/ | |
|   sub_pu_present_flag | ae(v) |
|   if(sub_pu_present_flag) | |
|     sub_pu_type | ae(v) |
|     num_sub_pu_lines | ae(v) |
|   bvd_coding( x00, y00, 2 ) | |
|   bvd_coding( x01, y01, 2 ) | |
|   bvp_flag[ x0 ][ y0 ] | ae(v) |
| else { /* MODE_INTER */ | |
|   ............... | |
|   } | |
| } | | sub_pu_present_flag:—specifies if there are sub-PU's within the PU or not. The sub_pu_present flag may not be signaled for certain PUs, such as for 2N×2N PU, AMP PU, N×N PU and the flag is inferred to be zero (no split) if it is not present.

sub_pu_type:—Specifies whether the syntax element num_sub_pu_lines correspond to rows or column num_sub_pu_lines:—specifies the number of rows/columns (based on the syntax sub_pu_type) with in the sub-PU.

FIG. 1 is a block diagram illustrating an example video encoding and decoding system 10 that may utilize techniques for flexibly dividing a prediction unit (PU) of video data into a plurality of sub-PUs of video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may store the encoded video generated by source device 12.

Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 31. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing video coding may be performed by any digital video encoding and/or decoding device. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 31 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 32) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the HEVC standard. While the techniques of this disclosure are not limited to any particular coding standard, the techniques may be relevant to the HEVC standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in HEVC has a purpose similar to the purpose of a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs, for example, differences between original and predicted values of the luma and chroma values of the original, unencoded pixels and the predicted pixels. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence using the data contained in the bitstream.

Video encoder 20 and video decoder 30 may perform intra- and inter-coding of video blocks within video slices. Intra-coding relies on spatial prediction to reduce or remove spatial redundancy in video within a given video picture. Inter-coding relies on temporal prediction or inter-view prediction to reduce or remove temporal redundancy in video within adjacent pictures of a video sequence or reduce or remove redundancy with video in other views. Intra-mode (I mode) may refer to any of several spatial based compression modes (i.e., DC, Planar, and a plurality of angular modes). Inter-modes, such as uni-directional prediction (P mode) or bi-prediction (B mode), may refer to any of several temporal-based compression modes.

Many applications, such as remote desktop, remote gaming, wireless displays, automotive infotainment, cloud computing, or the like, are becoming routine in daily personal lives. Video content in these applications are typically combinations of natural content, text, artificial graphics, and the like. In text and artificial graphics, region of the content may include repeated patterns (such as characters, icons, and symbols to provide a few examples) often exist. Intra block copying (BC) is a technique that enables removal of this kind of redundancy, thereby potentially improving the intra-picture coding efficiency, e.g., as described in Pang et al., "Non-RCE3: Intra Motion Compensation with 2-D MVs," Document: JCTVC-N0256, JCT-VC of ITU-T SG 16 WP 3 and ISO/IEC JTC 1/SC 29/WG 11, $14^{th}$ Meeting: Vienna, A T 25 Jul.-2 Aug. 2013 (hereinafter "JCTVC-N0256"). At a recent JCT-VC meeting, an Intra BC process was adopted in the HEVC Range Extension standard (which has since been moved to the Screen Content Coding (SCC) extension of HEVC).

Figure 2:
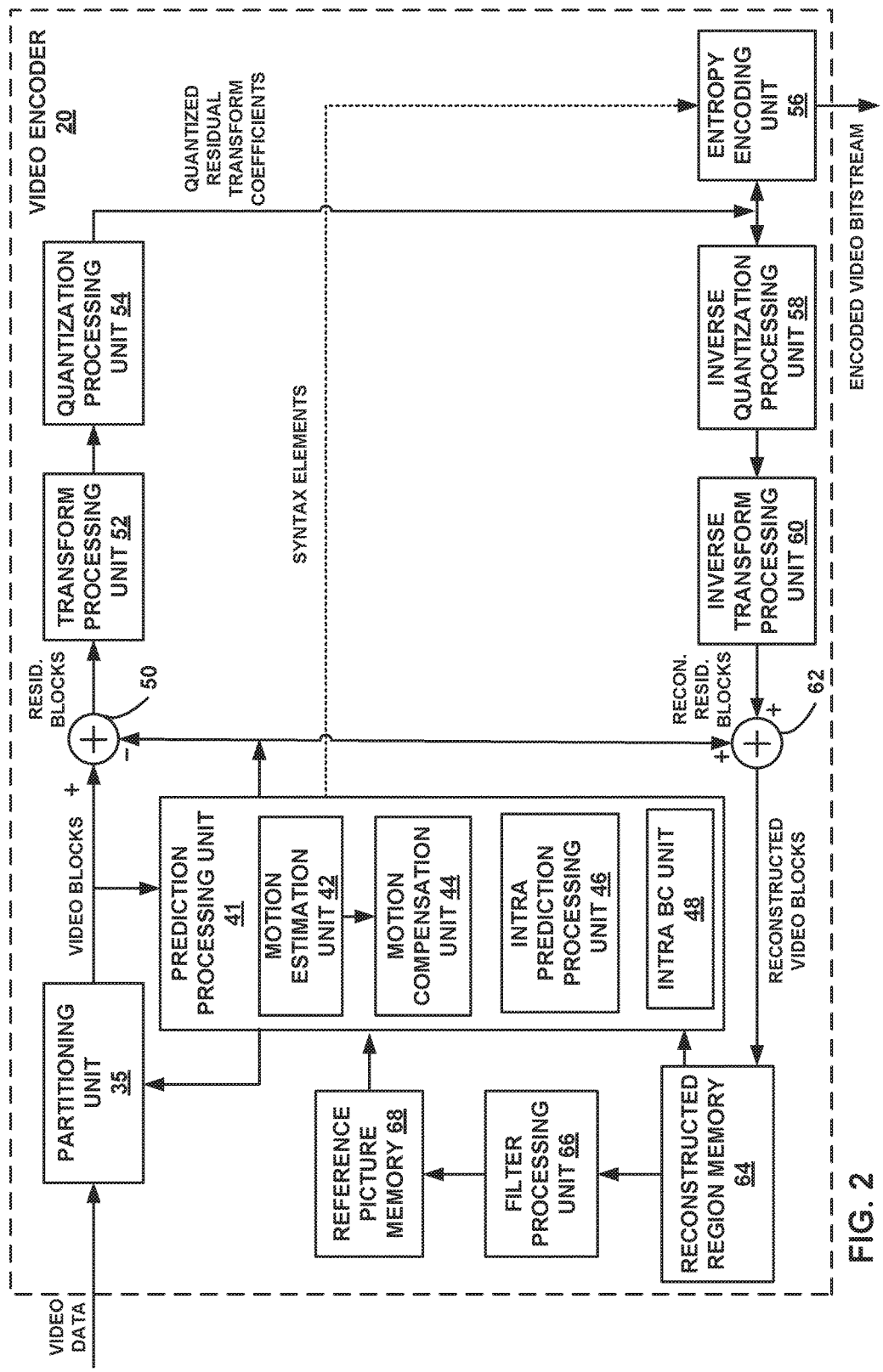
FIG. 2 is a block diagram illustrating an example video encoder that may implement the techniques described in this disclosure.

As illustrated in more detail in the example of FIG. 2, for a current coding unit (CU) (e.g., current video block 102 of FIG. 4) coded using Intra BC, video encoder 20 may obtain a prediction signal (e.g., prediction block 104 of FIG. 4) (which may also be referred to as a "prediction block") from a search region (e.g., search region 108 of FIG. 4) in the same picture. In some instances, video encoder 20 may encode a vector, e.g., block vector 106 of FIG. 4, which indicates the position of the prediction block displaced from the current CU. In some examples, the block vector may indicate the position of the top-left corner of the prediction block relative to the position of the top-left corner of the current CU. The block vector, in some instances, also may be referred to as an offset vector, displacement vector, or motion vector. Video encoder 20 may encode the current block using the prediction block identified by the block vector. For instance, video encoder 20 may determine a residual block that represents pixel differences between the prediction block and the current block, and encode the determined residual block along with the encoded block vector that identifies the prediction block.

Video decoder 30 also may be configured to use techniques that are generally reciprocal to those described above with respect to video encoder 20. In this respect, video decoder 30 may be configured to perform an Intra BC process to decode a coded current block of a picture using a prediction block identified by a block vector. For instance, video decoder 30 may generate the current block based on a residual block that represents pixel differences between the prediction block and the current block.

As discussed above, video encoder 20 may partition a coding unit (CU) into prediction units (PUs). In general, partitioning a CU into PUs enables video encoder 20 to obtain better prediction and minimize residual values, which may reduce the size of the bitstream. However, in some examples, it may not be desirable for video encoder 20 to be limited to a predefined set of PU sizes when dividing a CU of video data. For instance, when encoding screen content sequences, which exhibit rapid changes in the content, the fixed PU partition sizes may not be efficient.

In accordance with one or more techniques of this disclosure, as opposed to being restricted to fixed size PUs or line based PUs (e.g., SDIP), video encoder 20 may implement a flexible partitioning scheme in which a PU may be divided into a plurality of sub-PUs that each include an adjustable number of lines (i.e., rows or columns) of samples or pixels. As one example, video encoder 20 may divide a 32×32 CU into four 16×16 PUs (e.g., N×N) and further divide at least one of the 16×16 PUs into one 3×16 sub-PU and one 13×16 sub-PU. As another example, video encoder 20 may divide a 16×16 CU into one 12×16 PU and one 4×16 PU (e.g., nR×2N) and further divide the 12×16 PU into one 5×16 sub-PU and one 11×16 sub-PU. As yet another example, video encoder 20 may divide a 16×16 CU into one 16×12 PU and one 16×4 PU (e.g., 2N×nD) and further divide the 16×4 PU into one 16×1 sub-PU and one 16×3 sub-PU. In this way, video encoder 20 may obtain better prediction and minimize residual values.

In some examples, video encoder 20 may signal the PU split information by encoding a syntax element that indicates a number of consecutive lines of samples (or pixels) that are in one or more of a plurality of sub-PUs of a current PU of a current CU of video data. As one example, video encoder 20 may encode a first syntax element that indicates that a first sub-PU includes five consecutive lines of the current CU and a second syntax element that indicates that a second sub-PU includes three consecutive lines of the current CU. In some examples, video encoder 20 may encode, for each respective sub-PU, a separate syntax element that indicates a respective number of lines that are in the respective sub-PU. In some examples, video encoder 20 may encode, for each respective sub-PU of a current PU except a last sub-PU of the current PU, a separate syntax element that indicates a respective number of lines that are in the respective sub-PU. In such examples, the number of lines included in the last sub-PU of the current PU may be inferred based on the total number of lines included in the current PU and the total number of lines included in other sub-PUs of the current PU.

In some examples, video encoder 20 may encode an indication of whether the current PU is horizontally or vertically divided into the plurality of sub-PUs. Where the current PU is horizontally divided, video encoder 20 may determine that the lines in the sub-PUs are rows of video data. Similarly, where the current PU is vertically divided, video encoder 20 may determine that the lines in the sub-PUs are columns of video data.

In some examples, the syntax element encoded by video encoder 20 that indicates the number of lines that are in one or more of a plurality of sub-PUs of a current PU of a current CU of video data may indicate a number of lines of luma samples. In some examples, such as where the number of chroma pixels is the same as the number of luma samples (i.e., 4:4:4 profiles), each sub-PU may include an identical number of lines of chroma samples and lines of luma samples. In some examples, such as where the number of chroma pixels is different than the number of luma samples (i.e., non 4:4:4 profiles), each sub-PU may include a different number of lines of chroma samples and lines of luma samples. For instance, in a 4:2:2 profile, video encoder 20 may divide a 16×16 PU into a 4×16 sub-PU that includes four lines of luma samples and two lines of chroma samples and two 6×16 sub-PUs that each include six lines of luma samples and three lines of chroma samples, and encode a first syntax element indicating that a first sub-PU includes four lines of luma samples, a second syntax element indicating that a second sub-PU includes six lines of luma samples, and a third syntax element indicating that the 16×16 PU is vertically divided into the sub-PUs.

Video encoder 20 may signal prediction information for each sub-PU of the plurality of sub-PUs. For instance, video encoder 20 may signal, for each respective sub-PU of the plurality of sub-PUs, an indication of a respective vector that represents a displacement between the respective sub-PU and a respective predictor block. In some examples, video encoder 20 may signal, for each respective sub-PU of the plurality of sub-PUs, a respective residual block that represents pixel differences between the pixels of the respective sub-PU and the respective predictor block.

In some examples, video encoder 20 may signal an indication of whether or not the flexible partitioning scheme is applied to a particular PU. For instance, video encoder 20 may signal a syntax element that indicates whether or not a current PU is divided into a plurality of sub-PUs. When flexible partitioning is enabled, video encoder 20 may signal the sub-partition information (e.g., the PU split information and the prediction information).

In any case, video decoder 30 may implement a complimentary process to video encoder 20. For instance, video decoder 30 may implement a flexible partitioning scheme in which a PU may be divided into a plurality of sub-PUs that each include an adjustable number of lines (i.e., rows or columns).

In some examples, video decoder 30 may divide a current PU into a plurality of sub-PUs based on PU split information. For instance, video decoder 30 may decode a syntax element that indicates a number of lines that are in one or more of a plurality of sub-PUs of a current PU of a current CU of video data. As one example, video decoder 30 may decode a first syntax element that indicates that a first sub-PU includes five lines of the current CU and decode a second syntax element that indicates that a second sub-PU includes three lines of the current CU. In some examples, video decoder 30 may decode, for each respective sub-PU, a separate syntax element that indicates a respective number of lines that are in the respective sub-PU. In some examples, video decoder 30 may decode, for each respective sub-PU of a current PU except a last sub-PU of the current PU, a separate syntax element that indicates a respective number of lines that are in the respective sub-PU. In such examples, video decoder 30 may infer the number of lines included in the last sub-PU of the current PU based on the total number of lines included in the current PU and the total number of lines included in other sub-PUs of the current PU.

In some examples, video decoder 30 may decode an indication of whether the current PU is horizontally or vertically divided into the plurality of sub-PUs. Where the current PU is horizontally divided, video decoder 30 may determine that the lines in the sub-PUs are rows of video data. Similarly, where the current PU is vertically divided, video decoder 30 may determine that the lines in the sub-PUs are columns of video data.

Video decoder 30 may receive prediction information for each sub-PU of the plurality of sub-PUs. For instance, video decoder 30 may decode, for each respective sub-PU of the plurality of sub-PUs, an indication of a respective vector that represents a displacement between the respective sub-PU and a respective predictor block. In some examples, video decoder 30 may decode, for each respective sub-PU of the plurality of sub-PUs, a respective residual block that represents pixel differences between the pixels of the respective sub-PU and the respective predictor block.

In some examples, video decoder 30 may signal an indication of whether or not the flexible partitioning scheme is applied to a particular PU. For instance, video decoder 30 may signal a syntax element that indicates whether or not a current PU is divided into a plurality of sub-PUs. When flexible partitioning is enabled, video decoder 30 may signal the sub-partition information (e.g., the PU split information and the prediction information).

FIG. 2 is a block diagram illustrating an example video encoder that may implement the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal or inter-view prediction to reduce or remove redundancy in video within adjacent frames or pictures of a video sequence. Intra-mode (I mode) may refer to any of several spatial based compression modes. Inter-modes, such as uni-directional prediction (P mode) or bi-prediction (B mode), may include to any of several temporal-based compression modes. Video encoder 20 may also be configured to utilize a mode for intra prediction of blocks of video data from predictive blocks of video data within the same picture, e.g., an Intra BC mode, as described herein.

In the example of FIG. 2, video encoder 20 includes a partitioning unit 35, prediction processing unit 41, reconstructed region memory 64, filter processing unit 66, reference picture memory 68, summer 50, transform processing unit 52, quantization processing unit 54, and entropy encoding unit 56. Prediction processing unit 41 includes motion estimation unit 42, motion compensation unit 44, intra prediction processing unit 46, and Intra Block Copy (Intra BC) unit 48. For video block reconstruction, video encoder 20 also includes inverse quantization processing unit 58, inverse transform processing unit 60, and summer 62.

In various examples, a unit of video encoder 20 may be tasked to perform the techniques of this disclosure. Also, in some examples, the techniques of this disclosure may be divided among one or more of the units of video encoder 20. For example, Intra BC unit 48 may perform the techniques of this disclosure, alone, or in combination with other units of video encoder, such as motion estimation unit 42, motion compensation unit 44, intra prediction processing unit 46, reconstructed region memory 64, and entropy encoding unit 56.

As shown in FIG. 2, video encoder 20 receives video data, and partitioning unit 35 partitions the data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Prediction processing unit 41 may select one of a plurality of possible coding modes, such as one of a plurality of intra coding modes, one of a plurality of inter coding modes, or an Intra BC mode, for the current video block based on rate-distortion results (e.g., coding bit rate and the level of distortion). Prediction processing unit 41 may provide the resulting predictive block to summer 50 to generate residual block data and to summer 62 to reconstruct the current block for use in prediction of other video blocks, e.g., as a reference picture.

In addition to selecting the coding mode, prediction processing unit 41 may work with partitioning unit 35 to partition blocks of video data into sub-blocks. For example, partitioning unit 35 may initially partition a frame or slice into LCUs, and partition each of the LCUs into CUs based on rate-distortion analysis (e.g., rate-distortion optimization).

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures, e.g., to provide temporal compression.

Motion estimation unit 42 may be configured to determine the inter-prediction mode for a video slice according to a predetermined pattern for a video sequence. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. Similarly, the block vector used for Intra BC according to the techniques of this disclosure indicate the displacement of a PU of a video block within a current video frame or picture relative to a predictive block within the same frame or picture. Intra BC unit 48 may determine vectors, e.g., block vectors, for Intra BC coding in a manner similar to the determination of motion vectors by motion estimation unit 42 for inter prediction, or may utilize motion estimation unit 42 to determine the block vector.

A predictive block, e.g., identified by motion estimation unit 42 and/or Intra BC unit for inter prediction or Intra BC prediction, is a block that is found to closely match the PU of the video block to be coded in terms of pixel difference, which may be determined by sum of absolute difference (SAD), sum of squared difference (SSD), or other difference metrics. In some examples, video encoder 20 may calculate values for sub-integer pixel positions of reference pictures stored in reference picture memory 68 or the reconstructed region of the current picture stored in reconstructed region memory 64. For example, video encoder 20 may interpolate values of one-quarter pixel positions, one-eighth pixel positions, or other fractional pixel positions of the reference picture. Therefore, motion estimation unit 42 and/or Intra BC unit 48 may perform a search for a predictive block relative to the full pixel positions and fractional pixel positions and output a vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 68. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists.

In some examples, Intra BC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, Intra BC unit 48 may use motion estimation unit 42 and motion compensation unit 44, in whole or in part, to perform such functions for Intra BC prediction according to the techniques described herein. In either case, for Intra BC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

In any case video encoder 20 may form a residual video block by subtracting pixel values of the predictive block from the pixel values of the current video block being coded, forming pixel difference values. The pixel difference values form residual data for the block, and may include both luma component differences and chroma component differences. Summer 50 represents the component or components that perform this subtraction operation. Intra BC unit 48 and/or motion compensation unit 44 may also generate syntax elements associated with the video blocks and the video slice for use by a video decoder, such as video decoder 30, in decoding the video blocks of the video slice. The syntax elements may include, for example, syntax elements defining the vector used to identify the predictive block, any flags indicating the prediction mode, or any other syntax described with respect to the techniques of this disclosure.

Intra-prediction processing unit 46 may intra-predict a current block, as an alternative to the inter-prediction performed by motion estimation unit 42 and motion compensation unit 44, or the Intra BC prediction performed by Intra BC unit 48, as described above. In particular, intra-prediction processing unit 46 may determine an intra-prediction mode to use to encode a current block. In some examples, intra-prediction processing unit 46 may encode a current video block using various intra-prediction modes, e.g., during separate encoding passes, and intra-prediction processing unit 46 (or prediction processing unit 41, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via inter-prediction, intra-prediction, or Intra BC prediction, video encoder 20 forms a residual video block by subtracting the predictive block from the current video block, e.g., via summer 50. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 56 may perform any of the techniques described herein for binarization and encoding syntax elements, including vector components, flags, and other syntax elements, for the prediction according to the Intra BC mode. Following the entropy encoding by entropy encoding unit 56, the encoded video bitstream may be transmitted to video decoder 30, or archived for later transmission or retrieval by video decoder 30.

Inverse quantization processing unit 58 and inverse transform processing unit 60 apply inverse quantization and inverse transformation, respectively, to reconstruct the residual block in the pixel domain for later use as a reference block for prediction of other video blocks. Motion compensation unit 44 and/or Intra BC unit 48 may calculate a reference block by adding the residual block to a predictive block of one of the reference pictures within one of the reference picture lists. Motion compensation unit 44 and/or Intra BC unit 48 may also apply one or more interpolation filters to the reconstructed residual block to calculate sub-integer pixel values for use in motion estimation.

Summer 62 adds the reconstructed residual block to the motion compensated prediction block produced by motion compensation unit 44 and/or Intra BC unit 48 to produce a reconstructed video block. Reconstructed region memory 64 stores reconstructed video blocks according to the definition of the reconstructed region for Intra BC of a current video block by video encoder 20, e.g., Intra BC unit 48, as described herein. Reconstructed region memory 64 may store reconstructed video blocks that have not been in-loop filtered by filter processing unit 66. Summer 62 may provide the reconstructed video blocks to filter processing unit 66 in parallel with reconstructed region memory 64, or reconstructed region memory 64 may release the reconstructed video blocks to filter processing unit 66 when no longer needed for the reconstructed region for Intra BC. In either case, Intra BC unit 48 may search the reconstructed video blocks in reconstructed region memory 64 for a predictive video block within the same picture as the current video block to predict the current video block.

Filter processing unit 66 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 68 as reference pictures. The reference pictures may include reconstructed blocks that may be used by motion estimation unit 42 and motion compensation unit 44 as a predictive block to inter-predict a block in a subsequent video frame or picture.

In some examples, entropy encoding unit 56 may encode the value of a block vector using the motion vector difference (MVD) coding method in HEVC. In some examples, as opposed to encoding a value of a block vector using the MVD coding method in HEVC, entropy encoding unit 56 may encode the value of a block vector using an encoding method tailored to the characteristics of block vectors. In this way, techniques of this disclosure may reduce the number of syntax elements used to encode the value of a block vector, which may improve coding efficiency.

The block vector may be a two-dimensional block vector that includes a horizontal component and a vertical component or the block vector may be a one-dimensional block vector that includes a horizontal component or a vertical component. The horizontal component may represent a horizontal displacement between the predictive block of video data and the current block of video data. The vertical component may represent a vertical displacement between the predictive block of video data and the current block of video data. The predictive block of video data may be within the same frame as the current block of video data. Intra BC unit 48 may output a plurality of syntax elements for one or both of the horizontal component and the vertical component.

In some examples, as opposed to encoding syntax elements to represent the value of a block vector, entropy encoding unit 56 may encode syntax elements to represent a difference between the value of the block vector and a block vector predictor. In some examples, the block vector predictor may be the previously coded block vector (i.e., in a coding order). For instance, to encode the value of a block vector for a current block, Intra BC unit 48 may determine a difference between the block vector and the previously coded block vector, and cause entropy encoding unit 56 to encode one or more syntax elements that indicate the difference between the block vector and the previously coded block vector. In this way, Intra BC unit 48 may reduce the amount of data used to encode a block vector.

In some examples, Intra BC unit 48 may select a particular block vector predictor candidate from the plurality of block vector predictor candidates. For instance, Intra BC unit 48 may select the particular block vector predictor candidate as the block vector predictor candidate from the plurality of block vector predictor candidates that is the best match to the block vector for the current block. For instance, Intra BC unit 48 may determine which block vector predictor candidate from the plurality of block vector predictor candidates has a value closest to a value of the block vector for the current block.

As discussed above, Intra BC may be "merged" with the inter-prediction mode in some examples. In such examples, one or more of the operations described as being performed by Intra BC unit 48 may be performed by one or more other components of video encoder 20, such as motion estimation unit 42 and/or motion compensation unit 44.

As discussed above, prediction processing unit 41 and/or partitioning unit 35 may partition blocks of video data into sub-blocks. For instance, prediction processing unit 41 and/or partitioning unit 35 may partition a picture of video data into LCUs and CUs, and may further partition CUs into PUs. In some examples, it may not be desirable for prediction processing unit 41 and/or partitioning unit 35 to be limited to a predefined set of PU sizes when dividing a CU of video data. For instance, when encoding screen content sequences, which exhibit rapid changes in the content, the fixed PU partition sizes may not be efficient.

In accordance with one or more techniques of this disclosure, as opposed to being restricted to fixed size PUs or line based PUs (e.g., SDIP), processing unit 41 and/or partitioning unit 35 may implement a flexible partitioning scheme in which a PU may be divided into a plurality of sub-PUs that each include an adjustable number of lines (i.e., rows or columns). As one example, processing unit 41 and/or partitioning unit 35 may divide a 32×32 CU into four 16×16 PUs (e.g., N×N) and further divide at least one of the 16×16 PUs into one 3×16 sub-PU and one 13×16 sub-PU. As another example, processing unit 41 and/or partitioning unit 35 may divide a 16×16 CU into one 12×16 PU and one 4×16 PU (e.g., nR×2N) and further divide the 12×16 PU into one 5×16 sub-PU and one 11×16 sub-PU. Additional examples and details of the flexible partitioning scheme are discussed below with reference to FIGS. 6A-6D.

In particular, prediction processing unit 41 may execute a variety of encoding passes for a block (e.g., a CU or coding tree unit (CTU)) of video data. During each pass, prediction processing unit 41 may test a variety of encoding decisions, such as partitionings of the block, prediction modes (e.g., intra- and inter-prediction), and the like. Such partitionings may include sub-dividing a PU into sub-PUs having particular number of lines of samples. At the end of each pass, prediction processing unit 41 may calculate rate-distortion metrics for the pass. Ultimately, prediction processing unit 41 may select the combination of encoding decisions that resulted in the encoding pass yielding the best performing rate-distortion characteristics.

In any case, by having the option of dividing a PU into sub-PUs, processing unit 41 and/or partitioning unit 35 may be able to locate a predictor block for each sub-PU with pixels that more closely match the pixels in the sub-PU. In this way, processing unit 41 and/or partitioning unit 35 may obtain better prediction and minimize residual values. Minimizing residual values in this manner may ultimately reduce the bitrate of a resulting bitstream including encoded video data.

Figure 3:
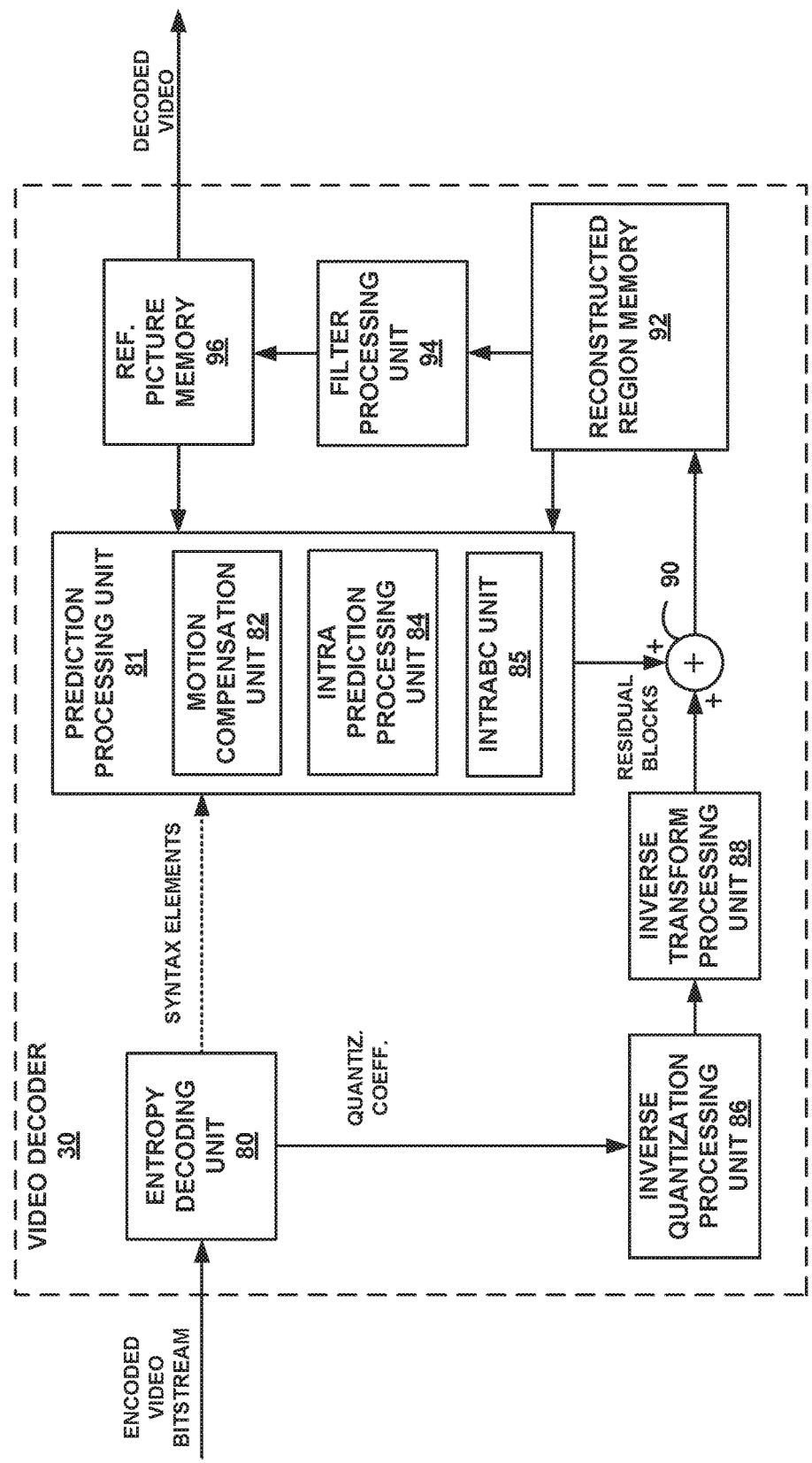
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes entropy decoding unit 80, prediction processing unit 81, inverse quantization processing unit 86, inverse transform processing unit 88, summer 90, reconstructed region memory 92, filter processing unit 94, and reference picture memory 96. Prediction processing unit 81 includes motion compensation unit 82, intra prediction processing unit 84, and an Intra Block Copy (Intra BC) unit 85. Video decoder 30 may, in some examples, perform a decoding pass generally reciprocal to the encoding pass described with respect to video encoder 20 from FIG. 2.

In various examples, a unit of video decoder 30 may be tasked to perform the techniques of this disclosure. Also, in some examples, the techniques of this disclosure may be divided among one or more of the units of video decoder 30. For example, Intra BC unit 85 may perform the techniques of this disclosure, alone, or in combination with other units of video decoder 30, such as motion compensation unit 82, intra prediction processing unit 84, reconstructed region memory 92, and entropy decoding unit 80.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors for inter prediction, block vectors for Intra BC prediction, and other syntax elements described herein. Entropy decoding unit 80 may perform the inverse of any of the techniques described herein for binarization and encoding of syntax elements, including vector components, flags, and other syntax elements, for the prediction according to the Intra BC mode. Entropy decoding unit 80 forwards the vectors and other syntax elements to prediction processing unit 81. Video decoder 30 may receive the syntax elements at the sequence level, the picture level, the video slice level and/or the video block level.

In accordance with one or more aspects of the techniques described in this disclosure, as opposed to decoding a value of a block vector using the motion vector difference (MVD) coding method in HEVC, entropy decoding unit 80 may decode the value of a block vector using a decoding method tailored to the characteristics of block vectors for Intra BC mode. For example, as opposed to decoding a value of a block vector based on four syntax elements, entropy decoding unit 80 may decode the value of a block vector based on three syntax elements.

In some examples, entropy decoding unit 80 may decode the value of a block vector using the motion vector difference (MVD) coding method in HEVC. In some examples, as opposed to encoding a value of a block vector using the MVD coding method in HEVC, entropy decoding unit 80 may decode the value of a block vector using an encoding method tailored to the characteristics of block vectors. In this way, techniques of this disclosure may reduce the number of syntax elements used to decode the value of a block vector, which may improve coding efficiency.

In accordance with one or more techniques of this disclosure, video decoder 30 may implement an adaptive PU partitioning scheme. For instance, prediction processing unit 81 may divide a current PU of a current CU of video data into a plurality of sub-PUs. In some examples, prediction processing unit 81 may divide the current PU into the plurality of sub-PUs in response to receiving, in an encoded video bitstream and for the current PU, an indication that the current PU is divided. For instance, prediction processing unit 81 may receive, from entropy decoding unit 80, a syntax element that indicates a number of lines that are in one or more of a plurality of sub-PUs of a PU of a current CU of video data. Additional examples and details of the flexible partitioning scheme are discussed below with reference to FIGS. 6A-6D.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, RefPicList0 and RefPicList1, using default construction techniques or any other technique based on reference pictures stored in reference picture memory 96. When the video block is coded according to the Intra BC mode described herein, Intra BC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from reconstructed region memory 92.

Motion compensation unit 82 and Intra BC unit 85 determine prediction information for a video block of the current video slice by parsing the vectors and other syntax elements, and use the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice. Similarly, Intra BC unit 85 may use some of the received syntax elements, e.g., a flag, to determine that the current video block was predicted using the Intra BC mode, construction information indicating which video blocks of the picture are within the reconstructed region and should be stored in reconstructed region memory 92, block vectors for each Intra BC predicted video block of the slice, Intra BC prediction status for each Intra BC predicted video block of the slice, and other information to decode the video blocks in the current video slice.

Motion compensation unit 82 and Intra BC unit 85 may also perform interpolation based on interpolation filters. Motion compensation unit 82 and Intra BC unit 85 may use interpolation filters as used by video encoder 20 during encoding of the video blocks to calculate interpolated values for sub-integer pixels of predictive blocks. In this case, motion compensation unit 82 and Intra BC unit 85 may determine the interpolation filters used by video encoder 20 from the received syntax elements and use the interpolation filters to produce predictive blocks.

Inverse quantization processing unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or Intra BC unit 85 generates the predictive block for the current video block based on the vectors and other syntax elements, video decoder 30 forms a decoded video block by summing the residual blocks from inverse transform processing unit 88 with the corresponding predictive blocks generated by motion compensation unit 82 and Intra BC unit 85. Summer 90 represents the component or components that perform this summation operation to produce reconstructed video blocks.

Reconstructed region memory 92 stores reconstructed video blocks according to the definition of the reconstructed region for Intra BC of a current video block by video encoder 20, as described herein. Reconstructed region memory 92 may store reconstructed video blocks that have not been in-loop filtered by filter processing unit 394. Summer 90 may provide the reconstructed video blocks to filter processing unit 94 in parallel with reconstructed region memory 92, or reconstructed region memory 92 may release the reconstructed video blocks to filter processing unit 94 when no longer needed for the reconstructed region for Intra BC. In either case, Intra BC unit 85 retrieves a predictive video block for a current video block from reconstructed region memory 92.

Filter processing unit 94 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 68 as reference pictures. The reference pictures may include reconstructed blocks that may be used by motion compensation unit 82 as predictive blocks to inter-predict a block in a subsequent video frame or picture. Reference picture memory 96 also stores decoded video for later presentation on a display device, such as display device 31 of FIG. 1.

As discussed above, Intra BC may be "merged" with the inter-prediction mode in some examples. In such examples, one or more of the operations described as being performed by Intra BC unit 85 may be performed by one or more other components of video decoder 30, such as motion compensation unit 82.

Figure 4:
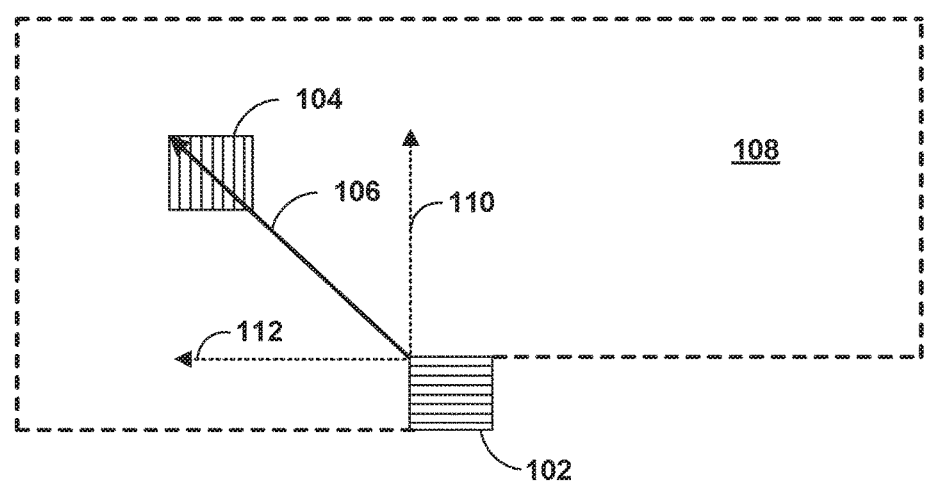
FIG. 4 illustrates an example of an intra-prediction process including Intra BC in accordance with the techniques of the present disclosure.

FIG. 4 illustrates an example of an intra-prediction process including Intra BC in accordance with the techniques of the present disclosure. According to one example intra-prediction process, video encoder 20 may select a predictor video block, e.g., from a set of previously coded and reconstructed blocks of video data. In the example of FIG. 4, reconstructed region 108 includes the set of previously coded and reconstructed video blocks. The blocks in the reconstructed region 108 may represent blocks that have been decoded and reconstructed by video decoder 30 and stored in reconstructed region memory 92, or blocks that have been decoded and reconstructed in the reconstruction loop of video encoder 20 and stored in reconstructed region memory 64. Current block 102 represents a current video block to be coded. Predictor block 104 represents one or more reconstructed video blocks, in the same picture as current block 102, which is used for Intra BC prediction of current block 102. It should be understood that predictor block 104 need not necessarily represent a single, previously coded block of video data (e.g., a CU or PU), but may instead overlap previously coded blocks that have been reconstructed and in some cases be deblocking filtered to remove blockiness artifacts.

In the example intra-prediction process, video encoder 20 may determine and encode block vector 106, which indicates the position of predictor block 104 relative to current block 102, together with the residue signal. For instance, as illustrated by FIG. 4, block vector 106 may indicate the position of the upper-left corner of predictor block 104 relative to the upper-left corner of current block 102. As discussed above, block vector 106 may also be referred to as an offset vector, displacement vector, motion vector (MV), or simply a vector. Video decoder 30 utilizes the encoded information for decoding the current CU.

FIGS. 5A-5D illustrate examples of how a coding unit may be partitioned into prediction units, in accordance with the techniques of the present disclosure. As discussed above, a video coder (e.g., video encoder 20 of FIGS. 1 and 2 and/or video decoder 30 of FIGS. 1 and 3) may divide a CU into one or more PUs. For instance, in SCC Draft 1, a video coder may divide a CU into two 2N×N PUs or two N×2N PUs regardless of the size of the CU (where N represents half the length of a CU's side). In addition, when the CU is the smallest CU, a video coder may alternatively divide the CU into four N×N PUs under SCC Draft 1.

Figures 5A, 5B:
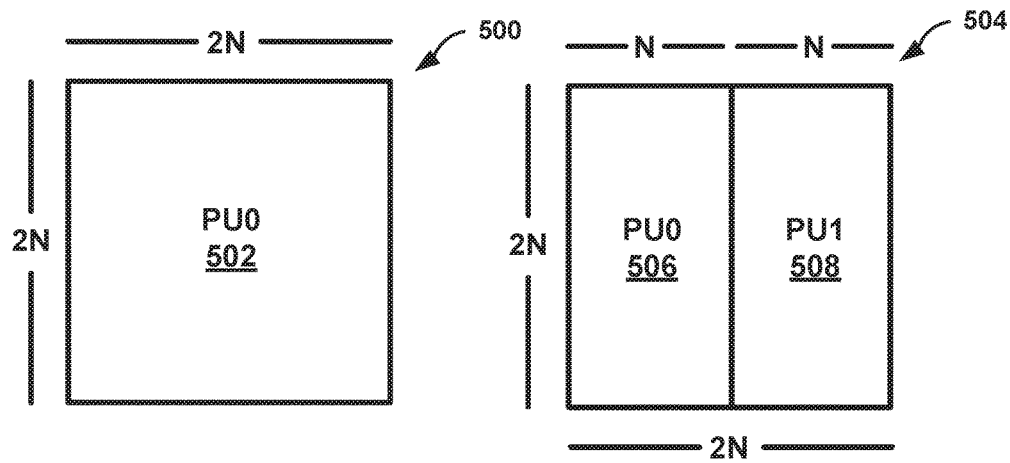
FIGS. 5A-5D illustrate examples of how a coding unit may be partitioned into prediction units, in accordance with the techniques of the present disclosure.
Figures 5C, 5D:
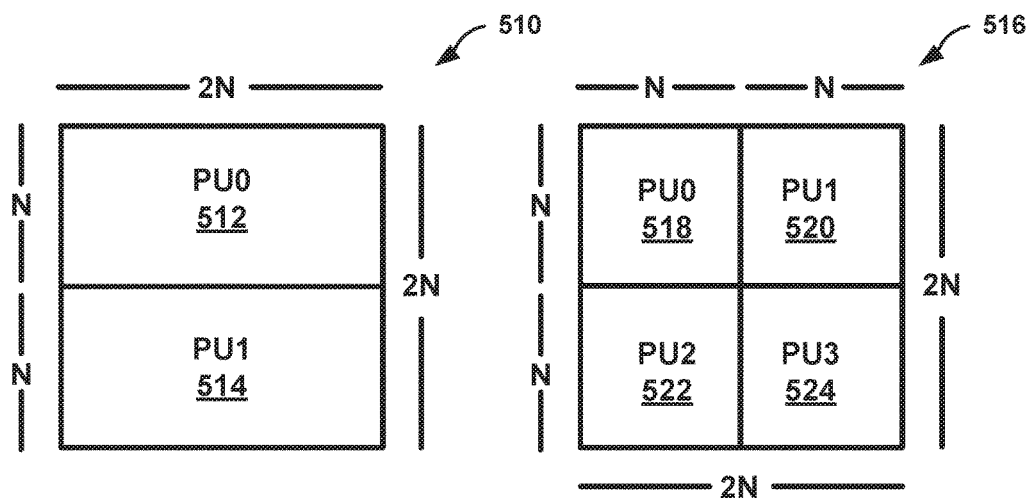

As shown in the example of FIG. 5A, a video coder may divide 2N×2N CU 500 into a single 2N×2N PU (PU0 502). As shown in the example of FIG. 5B, a video coder may divide 2N×2N CU 504 into two N×2N PUs (PU0 506 and PU1 508). As shown in the example of FIG. 5C, a video coder may divide 2N×2N CU 510 into two 2N×N PUs (PU0 512 and PU1 514). As shown in the example of FIG. 5D, a video coder may divide 2N×2N CU 516 into four N×N PUs (PU0 518, PU1 520, PU2 522, and PU3 524).

FIGS. 6A-6D illustrate examples of how a prediction unit may be sub-divided into sub-prediction units, in accordance with the techniques of the present disclosure. As discussed above and in accordance with one or more techniques of this disclosure, as opposed to being restricted to fixed size PUs (e.g., 2N×2N, 2N×N, N×2N, N×N, 2N×nU, 2N×nD, nL×2N, and nR×2N) or line based PUs (e.g., SDIP), a video coder may implement a flexible partitioning scheme in which a PU may be divided into a plurality of sub-PUs that each include an adjustable number of lines (i.e., rows or columns).

Figures 6A, 6B:
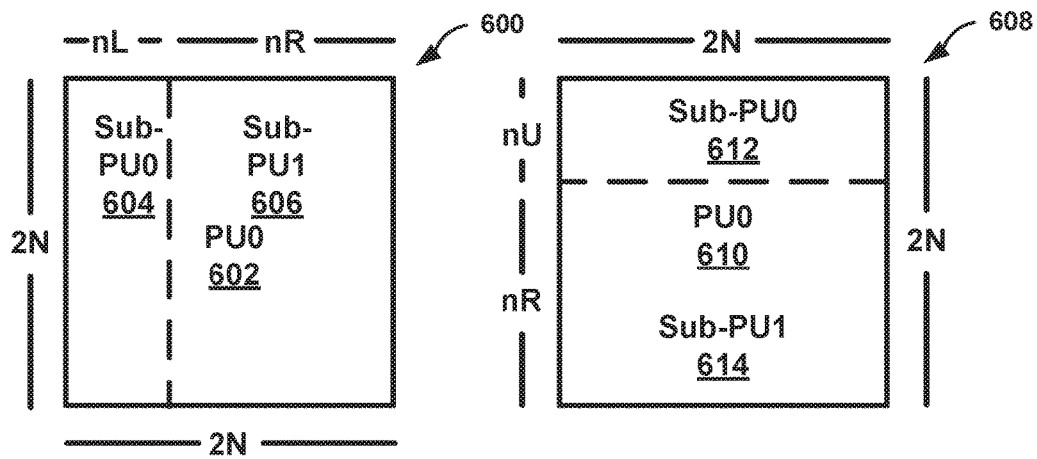
FIGS. 6A-6D illustrate examples of how a prediction unit may be sub-divided into sub-prediction units, in accordance with the techniques of the present disclosure.

In the example of FIG. 6A, similar to the example of FIG. 5A, a video coder may divide 2N×2N CU 600 into PU0 602 which is a single 2N×2N PU. However, in the example of FIG. 6A, the video coder may further divide PU0 602 into nL×2N sub-PU0 604 and nR×2N sub-PU1 606 (where nL is the number of columns included in sub-PU0 604 and nR is the number of columns included in sub-PU1 606).

In the example of FIG. 6B, similar to the example of FIG. 5A, a video coder may divide 2N×2N CU 608 into PU0 610 which is a single 2N×2N PU. However, in the example of FIG. 6B, the video coder may further divide PU0 610 into 2N×nU sub-PU0 612 and 2N×nR sub-PU1 614 (where nU is the number of rows included in sub-PU0 612 and nR is the number of rows included in sub-PU1 614).

Figures 6C, 6D:
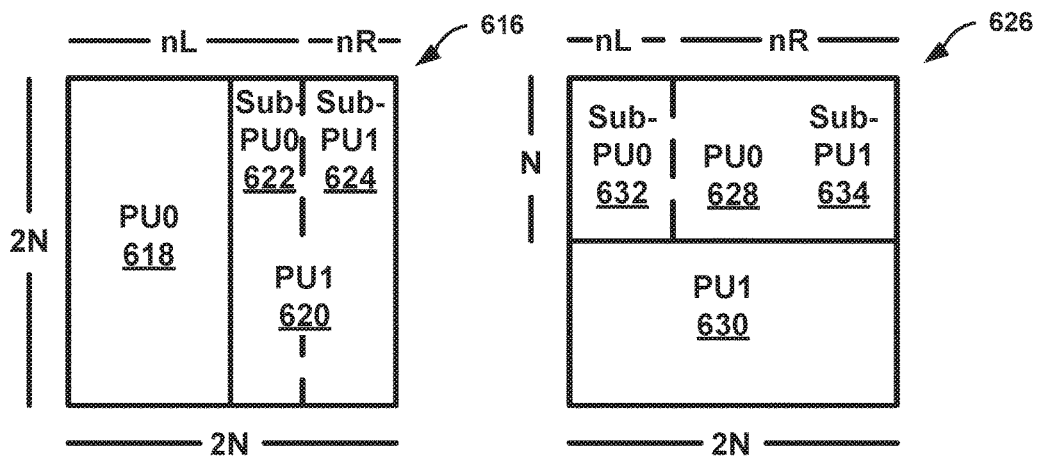

In the example of FIG. 6C, similar to the example of FIG. 5B, a video coder may divide 2N×2N CU 616 into PU0 618 and PU1 620 which are both N×2N PUs. However, in the example of FIG. 6C, the video coder may further divide PU1 620 into 2N×nL-N sub-PU0 622 and 2N×nR sub-PU1 624 (where nL-N is the number of columns included in sub-PU0 622 and nR is the number of columns included in sub-PU1 624).

In the example of FIG. 6D, similar to the example of FIG. 5C, a video coder may divide 2N×2N CU 626 into PU0 628 and PU1 630 which are both 2N×N PUs. However, in the example of FIG. 6D, the video coder may further divide PU0 628 into nL×N sub-PU0 632 and nR×N sub-PU1 634 (where nL is the number of columns included in sub-PU0 632 and nR is the number of columns included in sub-PU1 634).

In each of FIGS. 6A-6D, a video coder may code one or more syntax elements to indicate the split information. In some examples, a video coder may code one or more syntax elements that indicate a number of lines (i.e., rows or columns) that are in the sub-PUs. For instance, in the example of FIG. 6A, a video coder may code a syntax element that specifies how many lines are included in sub-PU0 (i.e., specifies the value of nL). In some examples, a video coder may code a syntax element that indicates whether the current PU is divided horizontally or vertically. For instance, in the example of FIG. 6A, a video coder may code a syntax element that specifies that PU0 602 is divided vertically. In some examples, a video coder may code a syntax element that specifies whether a current PU is divided into a plurality of sub-PUs. For instance, in the examples of FIGS. 6A-6D, a video coder may code a syntax element that indicates that a current PU is divided into a plurality of sub-PUs.

Figure 7:
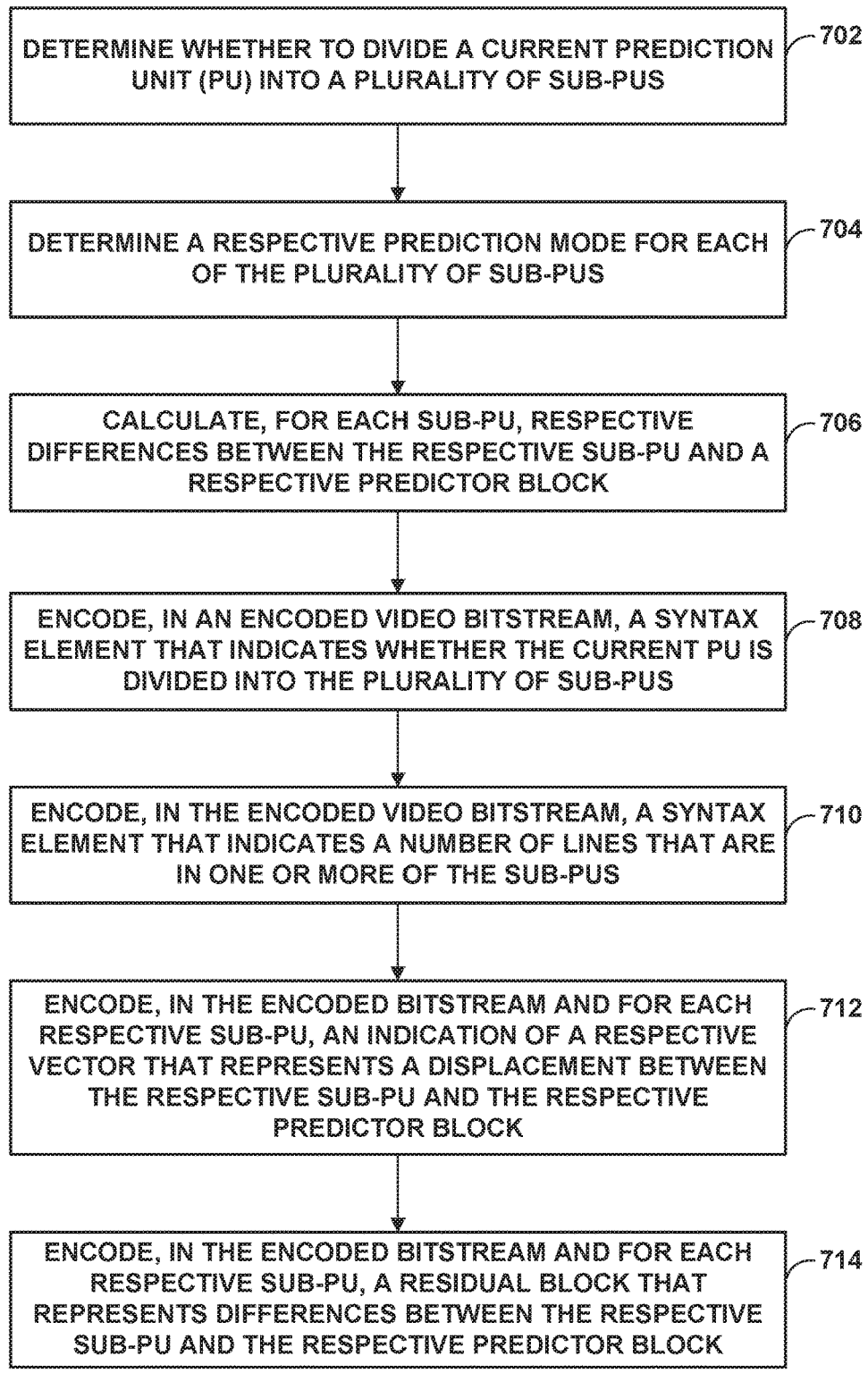
FIG. 7 is a flow diagram illustrating example operations of a video encoder to flexibly partition a PU into a plurality of sub-PUs, in accordance with one or more techniques of the disclosure.

FIG. 7 is a flow diagram illustrating example operations of a video encoder to flexibly partition a PU into a plurality of sub-PUs, in accordance with one or more techniques of the disclosure. The techniques of FIG. 7 may be performed by one or more video encoders, such as video encoder 20 illustrated in FIGS. 1 and 2. For purposes of illustration, the techniques of FIG. 7 are described within the context of video encoder 20, although video encoders having configurations different than that of video encoder 20 may perform the techniques of FIG. 7.

In accordance with one or more techniques of this disclosure, video encoder 20 may determine whether to divide a current prediction unit (PU) into a plurality of sub-PUs (702). For instance, prediction processing unit 41 and/or partitioning unit 35 of video encoder 20 may determine whether to divide the current PU into a plurality of sub-PUs based on rate-distortion analysis (e.g., rate-distortion optimization).

In some examples, video encoder 20 may limit the number of sub-PUs into which a single PU may be divided. For instance, in some examples, video encoder 20 may divide a single PU into at most two sub-PUs. In some examples, video encoder 20 may limit the total number of PU partitions into which a CU may be divided. For instance, in some examples, video encoder 20 may limit the total number of undivided PUs (i.e., PUs that are not further divided into sub-PUs) and PUs in a single CU to be four (i.e., such that the number of undivided PUs in a CU plus the number of sub-PUs in the CU is less than or equal to four).

In some examples, video encoder 20 may refrain from dividing a PU in certain situations. For instance, video encoder 20 may refrain from further dividing an N×N PU (i.e., sub-PU splitting may not be enabled for N×N PU modes).

Video encoder 20 may determine a respective prediction mode for each of the plurality of sub-PUs (704). For instance, prediction processing unit 41 may select one of a plurality of possible coding modes, such as one of a plurality of intra coding modes, one of a plurality of inter coding modes, or an Intra BC mode, for each sub-PU. In some examples, prediction processing unit 41 may select the coding modes based on the rate-distortion results (e.g., coding bit rate and the level of distortion).

Video encoder 20 may calculate, for each sub-PU, respective differences between the respective sub-PU and a respective predictor block (706). For instance, prediction processing unit 41 may provide a predictor block for each sub-PU to summer 50, which may generate a respective residual block that represents respective differences between the respective sub-PU and the respective predictor block.

Video encoder 20 may encode, in an encoded bitstream, a syntax element that indicates whether the current PU is divided into the plurality of sub-PUs (708). For instance, prediction processing unit 41 may cause entropy encoding unit 56 to encode a flag (e.g., sub_pu_present_flag of Table 1) at the PU level with a value that indicates that adaptive partitioning is enabled (i.e., that the current PU is divided into the plurality of sub-PUs).

Video encoder 20 may encode, in the encoded video bitstream, a syntax element that indicates a number of lines that are in one or more of the sub-PUs of the plurality of sub-PUs (710). For instance, prediction processing unit 41 may cause entropy encoding unit 56 to encode a syntax element (e.g., num_sub_pu_lines of Table 1) that indicates a number of lines that are in a particular sub-PU of the plurality of sub-PUs. In some examples, prediction processing unit 41 may cause entropy encoding unit 56 to encode a separate respective syntax element that indicates a respective number of lines that are in each respective sub-PU of the plurality of sub-PUs. In some examples, prediction processing unit 41 may cause entropy encoding unit 56 to encode a separate respective syntax element that indicates a respective number of lines that are in each respective sub-PU of the plurality of sub-PUs except for a last sub-PU of the plurality of sub-PUs.

In some examples, video encoder 20 may decode, from the encoded video bitstream, an indication of whether the current PU is horizontally or vertically divided into the plurality of sub-PUs. For instance, prediction processing unit 41 may cause entropy encoding unit 56 to encode a syntax element (e.g., sub_pu_type of Table 1) that indicates whether the current PU is horizontally or vertically divided into the plurality of sub-PUs.

In some examples, video encoder 20 may select, for each respective sub-PU of the plurality of sub-PUs, a respective predictor block from a plurality of previously encoded blocks. For instance, as part of the rate-distortion analysis, prediction processing unit 41 may select, for each respective sub-PU of the plurality of sub-PUs, a respective predictor block from a plurality of previously encoded blocks of video data in a picture in which the current CU of video data occurs. Based on the selected predictor blocks, video encoder 20 may determine, for each respective sub-PU of the plurality of sub-PUs, a respective vector that represents a displacement between the respective sub-PU and the respective predictor block.

Video encoder 20 may encode, in the encoded video bitstream and for each respective sub-PU, an indication of the respective vector that represents the displacement between the respective sub-PU and the respective predictor block (712). In some examples, video encoder 20 may encode an indication of a vector that represents a displacement between a sub-PU and a predictor block by encoding a vector difference (VD) value that represents the difference between the value of the vector and a value of a vector predictor.

Prediction processing unit 41 may determine a respective vector predictor for each respective sub-PU of the plurality of sub-PUs. In some examples, prediction processing unit 41 may select the respective vector predictor for each sub-PU from a respective list of candidate vector predictors and encode an indication of which vector prediction is selected. In some examples, prediction processing unit 41 may determine the lists of candidate vector predictions using techniques similar to the techniques of SCC Draft 1. In some examples, prediction processing unit 41 may use the vector predictors of the current PU as the vector predictors for each sub-PU. In some examples, prediction processing unit 41 may include the respective vector for a previously coded sub-PU of a current PU in the respective list of candidate vector predictors of a current sub-PU of the current PU. In this way, a non-first sub-PU may use any of the already decoded block vectors of previous sub-PU as a vector predictor.

Prediction processing unit 41 may cause entropy encoding unit 56 to encode a vector difference (VD) value that represents the difference between the value of the vector and a value of a vector predictor. According to a first technique of this disclosure, prediction processing unit 41 may cause entropy encoding unit 56 to code one bin $b_0$ to indicate if the value of VD is greater than zero or not. Then, prediction processing unit 41 may cause entropy encoding unit 56 to code one bin $b_1$ to indicate if the value of VD is greater than N or not. In some examples, if the value of VD is greater than N (N=1, 2, 3, 4, . . . ), prediction processing unit 41 may cause entropy encoding unit 56 to code the remainder (VD minus N) using exponential golomb (EG) codes with order K (K=0, 1, 2, 3, 4 . . . ). In other examples, prediction processing unit 41 may cause entropy encoding unit 56 to code the value of the VD minus one using bypass coded fixed length (FL) codes with a length based on N. In other examples, prediction processing unit 41 may cause entropy encoding unit 56 to code the value of the BVD minus one using truncated codes. In some example, prediction processing unit 41 may cause entropy encoding unit 56 to code the $bin_0$ using a context or bypass coded. Similarly, prediction processing unit 41 may cause entropy encoding unit 56 to code bin $b_1$ using a context or bypass coded.

According to a second technique of this disclosure, prediction processing unit 41 may cause entropy encoding unit 56 to code one bin $b_0$ to indicate if the value of BVD is greater than zero or not. If the value of BVD is not equal to zero, prediction processing unit 41 may cause entropy encoding unit 56 to code then remaining (BVD minus 1) using EG codes with order K (K=0, 1, 2, 3, 4 . . . ).

According to a third technique of this disclosure, prediction processing unit 41 may cause entropy encoding unit 56 to code the BVD of a first sub-PU using context coded bins (as discussed above with respect to the first technique and the second technique). Prediction processing unit 41 may cause entropy encoding unit 56 to code the BVD's of the remaining sub-PUs using bypass coded bins (as discussed above with respect to the first technique and the second technique).

In any case, video encoder 20 may encode, in the encoded video bitstream and for each respective sub-PU, a residual block that represents differences between the respective sub-PU and the respective predictor block (714). For instance, after prediction processing unit 41 generates the predictive block for the current video block via inter-prediction, intra-prediction, or Intra BC prediction, video encoder 20 forms a residual video block by subtracting the predictive block from the current video block, e.g., via summer 50. Transform processing unit 52 may send the resulting transform coefficients to quantization processing unit 54, which may quantize the transform coefficients to further reduce bit rate. Following quantization, entropy encoding unit 56 entropy encodes the quantized transform coefficients.

Figure 8:
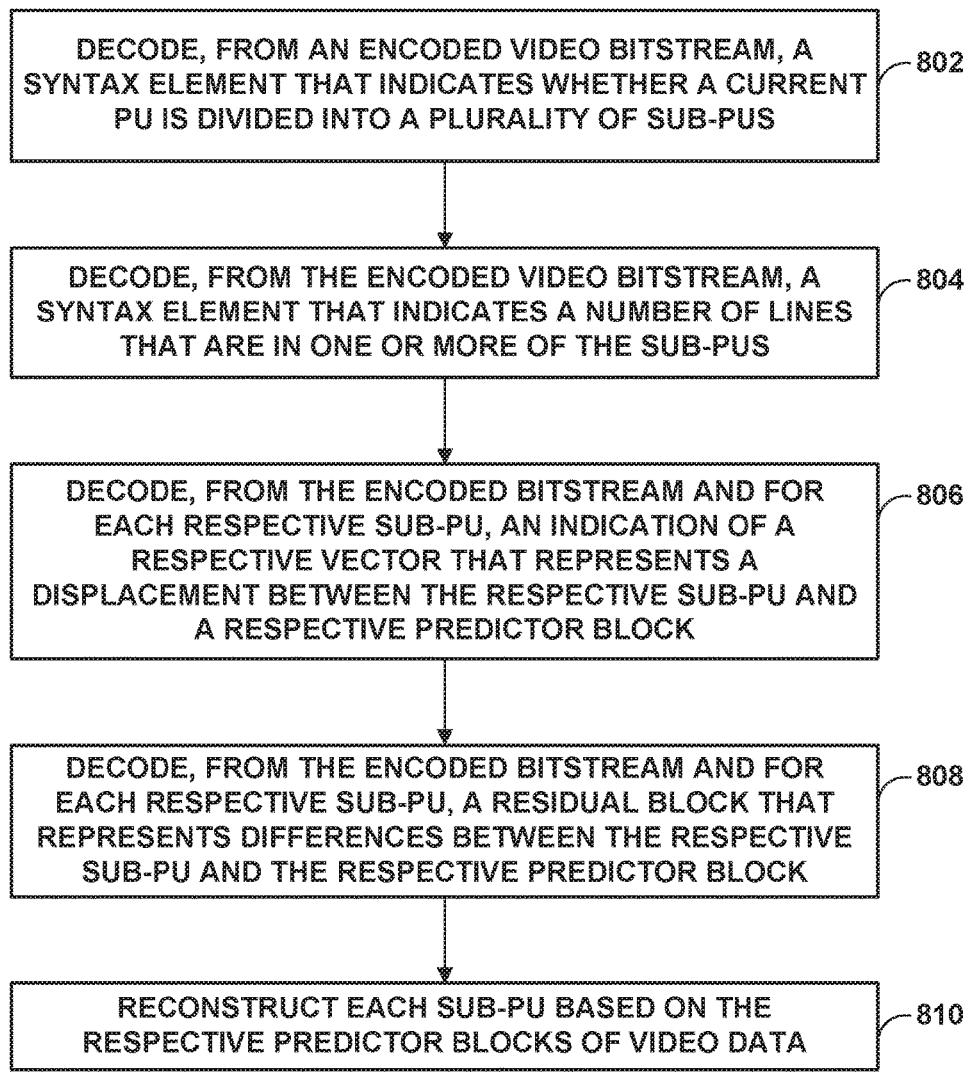
FIG. 8 is a flow diagram illustrating example operations of a video decoder to flexibly partition a PU into a plurality of sub-PUs, in accordance with one or more techniques of the disclosure.

FIG. 8 is a flow diagram illustrating example operations of a video decoder to flexibly partition a PU into a plurality of sub-PUs, in accordance with one or more techniques of the disclosure. The techniques of FIG. 8 may be performed by one or more video decoders, such as video decoder 30 illustrated in FIGS. 1 and 3. For purposes of illustration, the techniques of FIG. 8 are described within the context of video decoder 30, although video encoders having configurations different than that of video decoder 30 may perform the techniques of FIG. 8.

In accordance with one or more techniques of this disclosure, video decoder 30 may decode, from an encoded bitstream, a syntax element that indicates whether a current PU of a current CU is divided into a plurality of sub-PUs (802). For instance, entropy decoding unit 80 may decode, and provide to prediction processing unit 81, a flag (e.g., sub_pu_present_flag of Table 1) at the PU level with a value that indicates that adaptive partitioning is enabled (i.e., that the current PU is divided into the plurality of sub-PUs).

Video decoder 30 may decode, from the encoded video bitstream, a syntax element that indicates a number of lines that are in one or more of the sub-PUs (804). For instance, entropy decoding unit 80 may decode, and provide to prediction processing unit 81, a syntax element (e.g., num_sub_pu_lines of Table 1) that indicates a number of lines that are in a particular sub-PU of the plurality of sub-PUs. In some examples, entropy decoding unit 80 may decode a separate respective syntax element that indicates a respective number of lines that are in each respective sub-PU of the plurality of sub-PUs. In some examples, entropy decoding unit 80 may decode a separate respective syntax element that indicates a respective number of lines that are in each respective sub-PU of the plurality of sub-PUs except for a last sub-PU of the plurality of sub-PUs.

In some examples, video decoder 30 may decode, from the encoded video bitstream, an indication of whether the current PU is horizontally or vertically divided into the plurality of sub-PUs. For instance, entropy decoding unit 80 may decode, and provide to prediction processing unit 81, a syntax element (e.g., sub_pu_type of Table 1) that indicates whether the current PU is horizontally or vertically divided into the plurality of sub-PUs.

Video decoder 30 may decode, from the encoded video bitstream and for each respective sub-PU, an indication of the respective vector that represents the displacement between the respective sub-PU and the respective predictor block (806). In some examples, video decoder 30 may decode an indication of a vector that represents a displacement between a sub-PU and a predictor block by decoding a vector difference (VD) value that represents the difference between the value of the vector and a value of a vector predictor.

Prediction processing unit 81 may determine a respective vector predictor for each respective sub-PU of the plurality of sub-PUs. In some examples, prediction processing unit 81 may select the respective vector predictor for each sub-PU from a respective list of candidate vector predictors. For instance, prediction processing unit 81 may generate a list of candidate vector predictors, entropy decoding unit 80 may receive a syntax element that specifies an entry in the list, and prediction processing unit 81 may utilize the vector predictor in the specified entry to determine the vector.

In some examples, prediction processing unit 81 may determine the lists of candidate vector predictions using techniques similar to the techniques of SCC Draft 1. In some examples, prediction processing unit 81 may use the vector predictors of the current PU as the vector predictors for each sub-PU. In some examples, prediction processing unit 81 may include the respective vector for a previously coded sub-PU of a current PU in the respective list of candidate vector predictors of a current sub-PU of the current PU. In this way, a non-first sub-PU may use any of the already decoded block vectors of previous sub-PU as a vector predictor.

Entropy decoding unit 80 may decode, and provide to prediction processing unit 81, a vector difference (VD) value that represents the difference between the value of the vector and a value of the vector predictor. In some examples, entropy decoding unit 80 may decode the VD value using any of the techniques discussed above.

Video decoder 30 may decode, from the encoded video bitstream and for each respective sub-PU, a residual block that represents differences between the respective sub-PU and the respective predictor block (808). For instance, inverse quantization processing unit 86 may inverse quantize quantized transform coefficients provided in the bitstream and decoded by entropy decoding unit 80. Then inverse transform processing unit 88 may apply an inverse transform, e.g., an inverse DCT, an inverse integer transform, or a conceptually similar inverse transform process, to the transform coefficients in order to reconstruct the residual blocks in the pixel domain.

Video decoder 30 may reconstruct each sub-PU based on the respective predictor blocks of video data (810). For instance, summer 90 may form a decoded video block by summing the residual blocks from inverse transform processing unit 88 with the corresponding predictor blocks generated by prediction processing unit 81.

The following numbered examples may illustrate one or more aspects of the disclosure:

Example 1

A method of decoding video data, the method comprising: decoding, from an encoded video bitstream, a syntax element that indicates a number of lines of video data that are in one or more of a plurality of sub-PUs of a current prediction unit (PU) of a current coding unit (CU) of video data; determining, for each respective sub-PU of the plurality of sub-PUs, a respective vector that represents a displacement between the respective sub-PU and a respective predictor block from a plurality of previously decoded blocks of video data; and reconstructing each sub-PU of the plurality of sub-PUs based on the respective predictor blocks of video data.

Example 2

The method of example 1, wherein the respective predictor blocks for the plurality of sub-PUs are in a picture including the current CU of video data.

Example 3

The method of any combination of examples 1-2, wherein the plurality of sub-PUs includes at most two sub-PUs.

Example 4

The method of any combination of examples 1-3, wherein decoding the syntax element that indicates the number of lines that are in one or more of the plurality of sub-PUs comprises: decoding, for each respective sub-PU of the plurality of sub-PUs except a last sub-PU of the plurality of sub-PUs, a respective syntax element that indicates a respective number of lines that are in the respective sub-PU, the method further comprising: determining a number of lines that are in the last sub-PU of the plurality of sub-PUs based on the difference between a number of lines included in the current PU and a number of lines included on the other sub-PUs of the plurality of sub-PUs.

Example 5

The method of any combination of examples 1-4, further comprising decoding an indication of whether the current PU is horizontally or vertically divided into the plurality of sub-PUs.

Example 6

The method of any combination of examples 1-5, wherein a combined total of undivided PUs and sub-PUs is at most four, wherein an undivided PU does not include any sub-PUs.

Example 7

The method of any combination of examples 1-6, wherein the syntax element that indicates the number of lines that are in the one or more of the plurality of sub-PUs is a first syntax element, the method further comprising: decoding, from the encoded video bitstream and for the current PU of the current CU of video data, a second syntax element that indicates whether or not the current PU is divided into the plurality of sub-PUs, wherein decoding the first syntax element comprises decoding the first syntax element in response to the second syntax element indicating that the current PU is divided into the plurality of sub-PUs.

Example 8

The method of any combination of examples 1-7, wherein determining, for each respective sub-PU of the plurality of sub-PUs, a respective vector that represents a displacement between the respective sub-PU and a respective predictor block comprises: determining, for each respective sub-PU of the plurality of sub-PUs, a respective vector predictor; determining, for each respective sub-PU of the plurality of sub-PUs, a respective vector difference (VD) that each indicates a respective difference between a respective vector and the respective vector predictor; and determining, for each respective sub-PU, the respective vector based on the respective vector predictor and the respective VD.

Example 9

The method of any combination of examples 1-8, wherein determining the respective vector predictor comprises determining a respective list of candidate vector predictors, the method further comprising: including the respective vector for a previously coded sub-PU in the respective list of candidate vector predictors of a current sub-PU.

Example 10

A device for decoding video data, the device comprising: a memory configured to store video data; and one or more processors configured to perform the method of any combination of examples 1-9.

Example 11

A device for decoding video data, the device comprising: means for performing the method of any combination of examples 1-9.

Example 12

A computer-readable storage medium storing instructions that, when executed, cause one or more processors of a video decoding device to perform the method of any combination of examples 1-9.

Example 13

A method of encoding video data, the method comprising: determining to divide a current prediction unit (PU) of a current coding unit (CU) of video data into a plurality of sub-PUs; determining, for each respective sub-PU of the plurality of sub-PUs, a respective vector that represents a displacement between the respective sub-PU and a respective predictor block from a plurality of previously decoded blocks of video data; and encoding, in an encoded video bitstream, a syntax element that indicates a number of lines of video data that are in one or more of the plurality of sub-PUs.

Example 14

The method of example 13, wherein the respective predictor blocks for the plurality of sub-PUs are in a picture including the current CU of video data.

Example 15

The method of any combination of examples 13-14, wherein the plurality of sub-PUs includes at most two sub-PUs.

Example 16

The method of any combination of examples 13-15, wherein encoding the syntax element that indicates the number of lines that are in one or more of the plurality of sub-PUs comprises: encoding, for each respective sub-PU of the plurality of sub-PUs except a last sub-PU of the plurality of sub-PUs, a respective syntax element that indicates a respective number of lines that are in the respective sub-PU.

Example 17

The method of any combination of examples 13-16, further comprising encoding an indication of whether the current PU is horizontally or vertically divided into the plurality of sub-PUs.

Example 18

The method of any combination of examples 13-17, wherein a combined total of undivided PUs and sub-PUs is at most four, wherein an undivided PU does not include any sub-PUs.

Example 19

The method of any combination of examples 13-18, wherein the syntax element that indicates the number of lines that are in the one or more of the plurality of sub-PUs is a first syntax element, the method further comprising: encoding, in the encoded video bitstream and for the current PU of the current CU of video data, a second syntax element that indicates whether or not the current PU is divided into the plurality of sub-PUs, wherein encoding the first syntax element comprises encoding the first syntax element in response to determining to divide the current PU into the plurality of sub-PUs.

Example 20

The method of any combination of examples 13-19, further comprising: determining, for each respective sub-PU of the plurality of sub-PUs, a respective vector predictor; determining, for each respective sub-PU of the plurality of sub-PUs, a respective vector difference (VD) that each indicates a respective difference between a respective vector and the respective vector predictor; and encoding, in the encoded video bitstream and for each respective sub-PU, an indication of the respective VD and an indication of the respective vector predictor.

Example 21

The method of any combination of examples 13-20, wherein determining the respective vector predictor comprises determining a respective list of candidate vector predictors, the method further comprising: including the respective vector for a previously coded sub-PU in the respective list of candidate vector predictors of a current sub-PU.

Example 22

A device for decoding video data, the device comprising: a memory configured to store video data; and one or more processors configured to perform the method of any combination of examples 13-21.

Example 23

A device for decoding video data, the device comprising: means for performing the method of any combination of examples 13-21.

Example 24

A computer-readable storage medium storing instructions that, when executed, cause one or more processors of a video decoding device to perform the method of any combination of examples 13-21.

The following numbered clauses may illustrate one or more aspects of the disclosure:

Clause 1

A method of encoding video data, the method comprising: in response to determining to divide a current prediction unit (PU) of a current coding unit (CU) of video data, dividing the current PU into a plurality of sub-prediction units (sub-PUs); selecting, for each respective sub-PU of the plurality of sub-PUs, a respective predictor block from a plurality of previously encoded blocks of video data in a picture in which the current CU of video data occurs; determining, for each respective sub-PU of the plurality of sub-PUs, a respective block vector that represents a displacement between the respective sub-PU and the respective predictor block; and encoding data representing an indication that the current PU is divided into the plurality of sub-PUs and an indication of the respective block vector for each respective sub-PU of the plurality of sub-PUs.

Clause 2

The method of clause 1, wherein dividing the current PU into the plurality of sub-PUs comprises dividing the current PU into two sub-PUs.

Clause 3

The method of any combination of clauses 1-2, wherein the indication of the respective block vector for each respective sub-PU of the plurality of sub-PUs are encoded based on one or more block vector predictors.

Clause 4

The method of any combination of clauses 1-3, wherein encoding comprises encoding the data representing the indication of the respective block vector for each respective sub-PU of the plurality of sub-PUs using the block vector predictor of the PU.

Clause 5

The method of any combination of clauses 1-4, wherein the indication of the respective block vector for each respective sub-PU of the plurality of sub-PUs using different block vector predictors.

Clause 6

The method of any combination of clauses 1-5, wherein encoding comprises encoding the data representing the indication of the respective block vector for each respective sub-PU of the plurality of sub-PUs using the same block vector predictor.

Clause 7

The method of any combination of clauses 1-6, wherein encoding comprises encoding the data representing the indication of the respective block vector for each respective sub-PU of the plurality of sub-PUs as respective block vector differences (BVD) that each indicates a respective difference between a respective block vector and a respective block vector predictor.

Clause 8

The method of any combination of clauses 1-7, wherein encoding the BVD for a first sub-PU of the plurality of sub-PUs comprises encoding the BVD based on a BVD for a second sub-PU of the plurality of sub-PUs.

Clause 9

The method of any combination of clauses 1-8, further comprising encoding an indication of whether the current PU is horizontally or vertically divided into the plurality of sub-PUs.

Clause 10

The method of any combination of clauses 1-9, further comprising encoding an indication of a number of rows/columns that are in one or more of the plurality of sub-PUs.

Clause 11

The method of any combination of clauses 1-10, wherein encoding an indication of the number of rows/columns that are in one or more of the plurality of sub-PUs comprises encoding an indication of how many rows/columns are in each sub-PU of the plurality of sub-PUs except a last sub-PU of the plurality of sub-PUs.

Clause 12

The method of any combination of clauses 1-11, wherein encoding the indication of the number of rows/columns that are in one or more of the plurality of sub-PUs comprises encoding the indication of the number of rows/columns that are in one or more of the plurality of sub-PUs using truncated unary code.

Clause 13

The method of any combination of clauses 1-12, wherein encoding the indication of the number of rows/columns that are in one or more of the plurality of sub-PUs comprises encoding the indication of the number of rows/columns that are in one or more of the plurality of sub-PUs using truncated unary code with a max length based on the number of rows/columns in the PU.

Clause 14

The method of any combination of clauses 1-13, wherein encoding the indication of the number of rows/columns that are in one or more of the plurality of sub-PUs comprises encoding the indication of the number of rows/columns that are in one or more of the plurality of sub-PUs using fixed length code.

Clause 15

The method of any combination of clauses 1-14, wherein encoding the indication of the number of rows/columns that are in one or more of the plurality of sub-PUs comprises encoding the indication of the number of rows/columns that are in one or more of the plurality of sub-PUs using fixed length code with a length based on the number of rows/columns in the PU.

Clause 16

The method of any combination of clauses 1-15, wherein encoding the indication that the current PU is divided into the plurality of sub-PUs comprises encoding a syntax element that specifies whether the current PU is divided into sub-PUs.

Clause 17

A method for decoding video data using Intra Block Copy (BC), the method comprising: responsive to receiving, in an encoded video bitstream and for a current prediction unit (PU) of a current coding unit (CU) of video data, an indication that the current PU is divided, dividing the current PU into a plurality of sub-prediction units (sub-PUs) by at least: determining, for each respective sub-PU of the plurality of sub-PUs, a respective block vector that represents a displacement between the respective sub-PU and a respective predictor block from a plurality of previously encoded blocks of video data in a picture in which the current CU of video data resides; and reconstructing each sub-PU of the plurality of sub-PUs based on the respective predictor blocks of video data.

Clause 18

The method of clause 17, further comprising the method of any combination of any combination of clauses 1-16.

As discussed above, the techniques of this disclosure may reduce the amount of data needed to represent video data. Tables 2-4, below, represent some example test results that demonstrate an example reduction in the amount of data needed to represent the video data test sequences described by JCTVC-S1015, "Common conditions for screen content coding tests," Strasbourg, F R, 17-24 Oct. 2014, available at phenix.it-sudparis.eu/jct/doc_end_user/documents/19_Strasbourg/wg11/JCTVC-S1015-v2.zip. In particular, Table 2 shows example test results that demonstrate an example reduction in the amount of data needed to represent the video data test sequences described by JCTVC-S1015 for all Intra mode encoding.

TABLE 2

| | All Intra | | |
|---|---|---|---|
| | GN | B/U | R/V |
| RGB, text & graphics with motion, 1080p & 720p | −1.1% | −1.0% | −1.0% |
| RGB, mixed content, 1440p & 1080p | −1.0% | −0.9% | −0.9% |
| RGB, Animation, 720p | 0.0% | 0.0% | 0.0% |
| RGB, camera captured, 1080p | 0.0% | 0.0% | 0.0% |
| YUV, text & graphics with motion, 1080p & 720p | −1.0% | −0.9% | −0.9% |
| YUV, mixed content, 1440p & 1080p | −1.0% | −0.9% | −0.9% |
| YUV, Animation, 720p | 0.0% | 0.0% | 0.0% |
| YUV, camera captured, 1080p | 0.0% | 0.0% | 0.0% |
| Enc Time [%] | | 120% | |
| Dec Time [%] | | 101% | |

TABLE 3

| | Random Access | | |
|---|---|---|---|
| | GN | B/U | R/V |
| RGB, text & graphics with motion, 1080p & 720p | −0.7% | −0.6% | −0.7% |
| RGB, mixed content, 1440p & 1080p | −0.4% | −0.4% | −0.5% |
| RGB, Animation, 720p | 0.0% | 0.1% | 0.0% |
| RGB, camera captured, 1080p | 0.0% | 0.0% | 0.0% |
| YUV, text & graphics with motion, 1080p & 720p | −0.6% | −0.7% | −0.6% |
| YUV, mixed content, 1440p & 1080p | −0.5% | −0.3% | −0.3% |
| YUV, Animation, 720p | 0.0% | −0.2% | 0.1% |
| YUV, camera captured, 1080p | −0.1% | 0.0% | −0.1% |
| Enc Time [%] | | 103% | |
| Dec Time [%] | | #VALUE! | |

TABLE 4

| | Low delay B | | |
|---|---|---|---|
| | GN | B/U | R/V |
| RGB, text & graphics with motion, 1080p & 720p | −0.4% | −0.3% | −0.4% |
| RGB, mixed content, 1440p & 1080p | −0.3% | −0.1% | 0.0% |
| RGB, Animation, 720p | 0.0% | 0.1% | −0.1% |
| RGB, camera captured, 1080p | 0.0% | 0.0% | 0.1% |
| YUV, text & graphics with motion, 1080p & 720p | −0.3% | −0.4% | −0.6% |
| YUV, mixed content, 1440p & 1080p | −0.4% | −0.2% | −0.2% |
| YUV, Animation, 720p | 0.0% | −0.2% | −0.1% |
| YUV, camera captured, 1080p | 0.0% | 0.1% | 0.1% |
| Enc Time [%] | | 94% | |
| Dec Time [%] | | 95% | |

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding, from an encoded video bitstream and for a current prediction unit (PU) of a current coding unit (CU) of video data, a syntax element that explicitly indicates a number of lines of video data that are in a sub-PU of a plurality of sub-PUs of the current PU, wherein the number of lines is selected to include any number of lines greater than a threshold number of lines and less than a number of lines included in the current PU;
   determining, for each respective sub-PU of the plurality of sub-PUs, a respective vector that represents a displacement between the respective sub-PU and a respective predictor block from a plurality of previously decoded blocks of video data; and
   reconstructing each sub-PU of the plurality of sub-PUs based on the respective predictor blocks of video data.

2. The method of claim 1, wherein the respective predictor blocks for the plurality of sub-PUs are in a picture including the current CU of video data.

3. The method of claim 1, wherein the plurality of sub-PUs includes at most two sub-PUs.

4. The method of claim 1, further comprising:
   decoding, for each respective sub-PU of the plurality of sub-PUs except a last sub-PU of the plurality of sub-PUs, a respective syntax element that explicitly indicates a respective number of lines that are in the respective sub-PU, the method further comprising:
   determining a number of lines that are in the last sub-PU of the plurality of sub-PUs based on the difference between a number of lines included in the current PU and a number of lines included on the other sub-PUs of the plurality of sub-PUs.

5. The method of claim 1, further comprising decoding an indication of whether the current PU is horizontally or vertically divided into the plurality of sub-PUs.

6. The method of claim 1, wherein a combined total of undivided PUs and sub-PUs is at most four, wherein an undivided PU does not include any sub-PUs.

7. The method of claim 1, wherein the syntax element that explicitly indicates the number of lines that are in the sub-PU of the plurality of sub-PUs is a first syntax element, the method further comprising:
   decoding, from the encoded video bitstream and for the current PU of the current CU of video data, a second syntax element that indicates whether or not the current PU is divided into the plurality of sub-PUs,
   wherein decoding the first syntax element comprises decoding the first syntax element in response to the second syntax element indicating that the current PU is divided into the plurality of sub-PUs.

8. The method of claim 1, wherein determining, for each respective sub-PU of the plurality of sub-PUs, a respective vector that represents a displacement between the respective sub-PU and a respective predictor block comprises:
   determining, for each respective sub-PU of the plurality of sub-PUs, a respective vector predictor;
   determining, for each respective sub-PU of the plurality of sub-PUs, a respective vector difference (VD) that each indicates a respective difference between a respective vector and the respective vector predictor; and
   determining, for each respective sub-PU, the respective vector based on the respective vector predictor and the respective VD.

9. The method of claim 8, wherein determining the respective vector predictor comprises determining a respective list of candidate vector predictors, the method further comprising:
   including the respective vector for a previously coded sub-PU in the respective list of candidate vector predictors of a current sub-PU.

10. A method of encoding video data, the method comprising:
    determining to divide a current prediction unit (PU) of a current coding unit (CU) of video data into a plurality of sub-PUs that each include a number of lines that is greater than a threshold number of lines and less than a number of lines included in the current PU;
    determining, for each respective sub-PU of the plurality of sub-PUs, a respective vector that represents a displacement between the respective sub-PU and a respective predictor block from a plurality of previously decoded blocks of video data; and
    encoding, in an encoded video bitstream, a syntax element that explicitly indicates a number of lines of video data that are in a sub-PU of the plurality of sub-PUs.

11. The method of claim 10, wherein the respective predictor blocks for the plurality of sub-PUs are in a picture including the current CU of video data.

12. The method of claim 10, wherein the plurality of sub-PUs includes at most two sub-PUs.

13. The method of claim 10, further comprising:
encoding, for each respective sub-PU of the plurality of sub-PUs except a last sub-PU of the plurality of sub-PUs, a respective syntax element that explicitly indicates a respective number of lines that are in the respective sub-PU.

14. The method of claim 10, further comprising encoding an indication of whether the current PU is horizontally or vertically divided into the plurality of sub-PUs.

15. The method of claim 10, wherein a combined total of undivided PUs and sub-PUs is at most four, wherein an undivided PU does not include any sub-PUs.

16. The method of claim 10, wherein the syntax element that explicitly indicates the number of lines that are in the sub-PU of the plurality of sub-PUs is a first syntax element, the method further comprising:
encoding, in the encoded video bitstream and for the current PU of the current CU of video data, a second syntax element that indicates whether or not the current PU is divided into the plurality of sub-PUs,
wherein encoding the first syntax element comprises encoding the first syntax element in response to determining to divide the current PU into the plurality of sub-PUs.

17. The method of claim 10, further comprising:
determining, for each respective sub-PU of the plurality of sub-PUs, a respective vector predictor;
determining, for each respective sub-PU of the plurality of sub-PUs, a respective vector difference (VD) that each indicates a respective difference between a respective vector and the respective vector predictor; and
encoding, in the encoded video bitstream and for each respective sub-PU, an indication of the respective VD and an indication of the respective vector predictor.

18. The method of claim 17, wherein determining the respective vector predictor comprises determining a respective list of candidate vector predictors, the method further comprising:
including the respective vector for a previously coded sub-PU in the respective list of candidate vector predictors of a current sub-PU.

19. A device for encoding or decoding video data, the device comprising:
memory configured to store video data; and
one or more processors configured to:
encode or decode, from an encoded video bitstream and for a current prediction unit (PU) of a current coding unit (CU) of video data, a syntax element that explicitly indicates a number of lines of video data that are in a sub-PU of a plurality of sub-PUs of the current PU, wherein the number of lines is selected to include any number of lines greater than a threshold number of lines and less than a number of lines included in the current PU;
determine, for each respective sub-PU of the plurality of sub-PUs, a respective vector that represents a displacement between the respective sub-PU and a respective predictor block from a plurality of previously decoded blocks of video data; and
reconstruct each sub-PU of the plurality of sub-PUs based on the respective predictor blocks of video data.

20. The device of claim 19, wherein the respective predictor blocks for the plurality of sub-PUs are in a picture including the current CU of video data.

21. The device of claim 19, wherein the plurality of sub-PUs includes at most two sub-PUs.

22. The device of claim 19, wherein the one or more processors are further configured to:
encode or decode, for each respective sub-PU of the plurality of sub-PUs except a last sub-PU of the plurality of sub-PUs, a respective syntax element that explicitly indicates a respective number of lines that are in the respective sub-PU.

23. The device of claim 19, wherein the one or more processors are further configured to encode or decode an indication of whether the current PU is horizontally or vertically divided into the plurality of sub-PUs.

24. The device of claim 19, wherein a combined total of undivided PUs and sub-PUs is at most four, wherein an undivided PU does not include any sub-PUs.

25. The device of claim 19, wherein the syntax element that explicitly indicates the number of lines that are in the sub-PU of the plurality of sub-PUs is a first syntax element, and wherein the one or more processors are further configured to:
encode or decode, from the encoded video bitstream and for the current PU of the current CU of video data, a second syntax element that indicates whether or not the current PU is divided into the plurality of sub-PUs,
wherein the one or more processors are configured to encode or decode the first syntax element based on the second syntax element indicating that the current PU is divided into the plurality of sub-PUs.

26. The device of claim 19, wherein, to determine, for each respective sub-PU of the plurality of sub-PUs, a respective vector that represents a displacement between the respective sub-PU and a respective predictor block, the one or more processors are configured to:
determine, for each respective sub-PU of the plurality of sub-PUs, a respective vector predictor;
determine, for each respective sub-PU of the plurality of sub-PUs, a respective vector difference (VD) that each indicates a respective difference between a respective vector and the respective vector predictor; and
determine, for each respective sub-PU, the respective vector based on the respective vector predictor and the respective VD.

27. The device of claim 26, wherein, to determine the respective vector predictor, the one or more processors are configured to determine a respective list of candidate vector predictors, and wherein the one or more processors are further configured to:
include the respective vector for a previously coded sub-PU in the respective list of candidate vector predictors of a current sub-PU.

28. The device of claim 19, wherein the device comprises a video decoder, and wherein, to encode or decode the syntax element, the one or more processors are configured to decode the syntax element.

29. The device of claim 19, wherein the device comprises a video encoder, and wherein, to encode or decode the syntax element, the one or more processors are configured to encode the syntax element.

30. A non-transitory computer-readable storage medium storing instructions that, when executed, cause one or more processors of a video encoding or decoding device to:
encode or decode, for a current prediction unit (PU) of a current coding unit (CU) of video data, a syntax element that explicitly indicates a number of lines of video data that are in a sub-PU of a plurality of sub-PUs of the current PU, wherein the number of lines is selected to include any number of lines greater than a threshold number of lines and less than a number of lines included in the current PU;

determine, for each respective sub-PU of the plurality of sub-PUs, a respective vector that represents a displacement between the respective sub-PU and a respective predictor block from a plurality of previously decoded blocks of video data; and reconstruct each sub-PU of the plurality of sub-PUs based on the respective predictor blocks of video data.

* * * * *